(12) United States Patent
Garza et al.

(10) Patent No.: US 10,195,988 B1
(45) Date of Patent: *Feb. 5, 2019

(54) INTELLIGENT VEHICLE OCCUPANCY MONITORING SYSTEM

(71) Applicants: Steven P. Garza, Pearl City, HI (US); Lamar Channell, Mililani, HI (US)

(72) Inventors: Steven P. Garza, Pearl City, HI (US); Lamar Channell, Mililani, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,864

(22) Filed: Dec. 19, 2017

Related U.S. Application Data

(62) Division of application No. 15/166,187, filed on May 26, 2016, now Pat. No. 98,450,508.

(60) Provisional application No. 62/167,267, filed on May 27, 2015.

(51) Int. Cl.
| | |
|---|---|
| *B60Q 9/00* | (2006.01) |
| *H04W 4/80* | (2018.01) |
| *G08B 21/02* | (2006.01) |
| *H04L 29/08* | (2006.01) |
| *H04W 4/90* | (2018.01) |

(52) U.S. Cl.
CPC ........... *B60Q 9/00* (2013.01); *G08B 21/0205* (2013.01); *H04L 67/10* (2013.01); *H04W 4/80* (2018.02); *H04W 4/90* (2018.02)

(58) Field of Classification Search
CPC combination set(s) only.
See application file for complete search history.

(56) References Cited

U.S. PATENT DOCUMENTS

| | | |
|---|---|---|
| 5,793,291 A | 8/1998 | Thornton |
| 5,802,479 A | 9/1998 | Kithil et al. |
| 6,024,378 A | 2/2000 | Fu |
| 6,104,293 A | 8/2000 | Rossi |
| 6,259,362 B1 | 7/2001 | Lin |
| 6,356,203 B1 | 3/2002 | Halleck et al. |
| 6,489,889 B1 | 12/2002 | Smith |
| 6,714,132 B2 | 3/2004 | Edwards et al. |
| 6,812,844 B1 | 11/2004 | Burgess |
| 6,847,302 B2 | 1/2005 | Flanagan et al. |
| 6,922,147 B1 | 7/2005 | Viksnins et al. |
| 6,930,614 B2 | 8/2005 | Rackham et al. |

(Continued)

*Primary Examiner* — Travis R Hunnings
(74) *Attorney, Agent, or Firm* — Allen D. Hertz, P.A.; Allen D. Hertz

(57) ABSTRACT

A Bluetooth based vehicular internal monitoring device for preventing or mitigating the likelihood of leaving a living entity behind within an unattended vehicle with an interior exhibiting life threatening environmental conditions. The system leverages ultra-low powered micro sensors, and open source communication systems to convey data acquired by a number of remote monitoring apparatuses and a head unit controller. The system is activated using a remote controller area network device attached to the factory installed controller area network system to detect the presence of a driver or caregiver exiting the vehicle when the living entity is present within the vehicle. Should the driver side door open with the living entity within the vehicle, the head unit controller alarms to notify the driver of such. Integration with vehicle telematic services enables delivery of alerts and information to parents, caregivers, emergency contacts, and emergency responders.

20 Claims, 17 Drawing Sheets

(56) References Cited

U.S. PATENT DOCUMENTS

| | | | |
|---|---|---|---|
| 6,998,988 B1 | 2/2006 | Kalce | |
| 7,012,533 B2 | 3/2006 | Younse | |
| 7,170,401 B1 | 1/2007 | Cole | |
| 7,218,218 B1 | 5/2007 | Rogers | |
| 7,230,530 B1 | 6/2007 | Almquist | |
| 7,339,463 B2 | 3/2008 | Donaldson | |
| 7,786,852 B2 * | 8/2010 | Kautz | B60N 2/2812 340/425.5 |
| 8,058,983 B1 | 11/2011 | Davisson et al. | |
| 8,063,788 B1 | 11/2011 | Morningstar | |
| 8,190,332 B2 | 5/2012 | Saban | |
| 8,212,665 B2 | 7/2012 | Schoenberg et al. | |
| 8,378,801 B1 | 2/2013 | Freeman et al. | |
| 8,659,414 B1 | 2/2014 | Schuk | |
| 8,816,839 B1 * | 8/2014 | Rick | F16B 17/00 180/268 |
| 8,816,845 B2 | 8/2014 | Hoover et al. | |
| 8,841,997 B2 | 9/2014 | Silveira | |
| 9,845,050 B1 * | 12/2017 | Garza | B60Q 9/00 |
| 2002/0161501 A1 | 10/2002 | Dulin et al. | |
| 2003/0122662 A1 | 7/2003 | Quinonez | |
| 2003/0222775 A1 | 12/2003 | Rackham et al. | |
| 2004/0160320 A1 | 8/2004 | Edwards et al. | |
| 2007/0057799 A1 | 3/2007 | Monzo et al. | |
| 2007/0222622 A1 | 9/2007 | Sweeney | |
| 2009/0079557 A1 | 3/2009 | Miner | |
| 2009/0259369 A1 | 10/2009 | Saban | |
| 2011/0084807 A1 | 4/2011 | Logan et al. | |
| 2014/0015664 A1 | 1/2014 | Watson | |
| 2014/0052342 A1 | 2/2014 | Seibert | |
| 2014/0253314 A1 | 9/2014 | Rambalt et al. | |
| 2017/0104963 A1 * | 4/2017 | Veneziano | H04N 7/183 |

\* cited by examiner

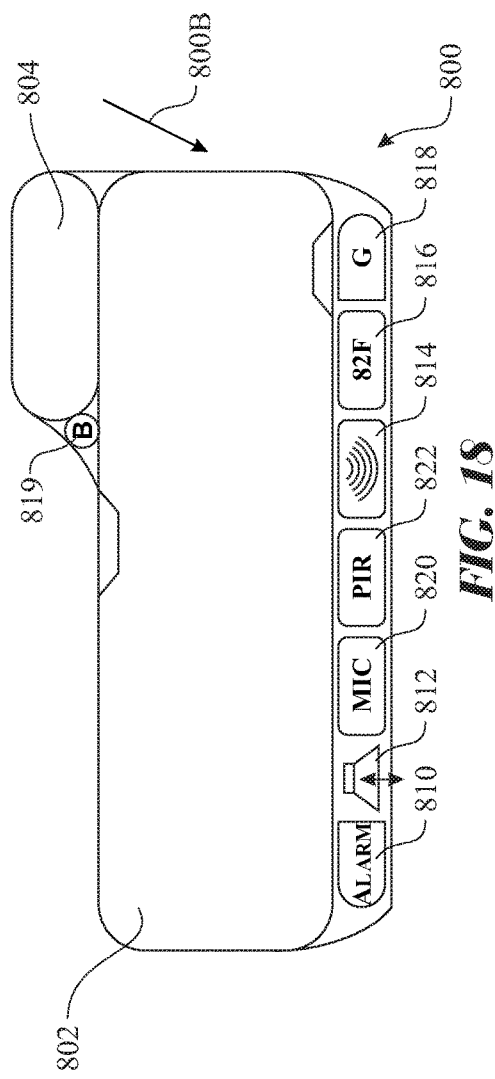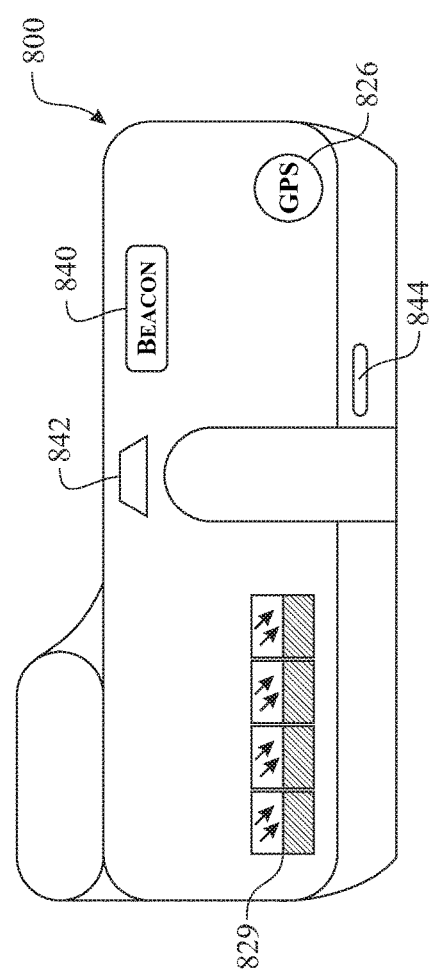

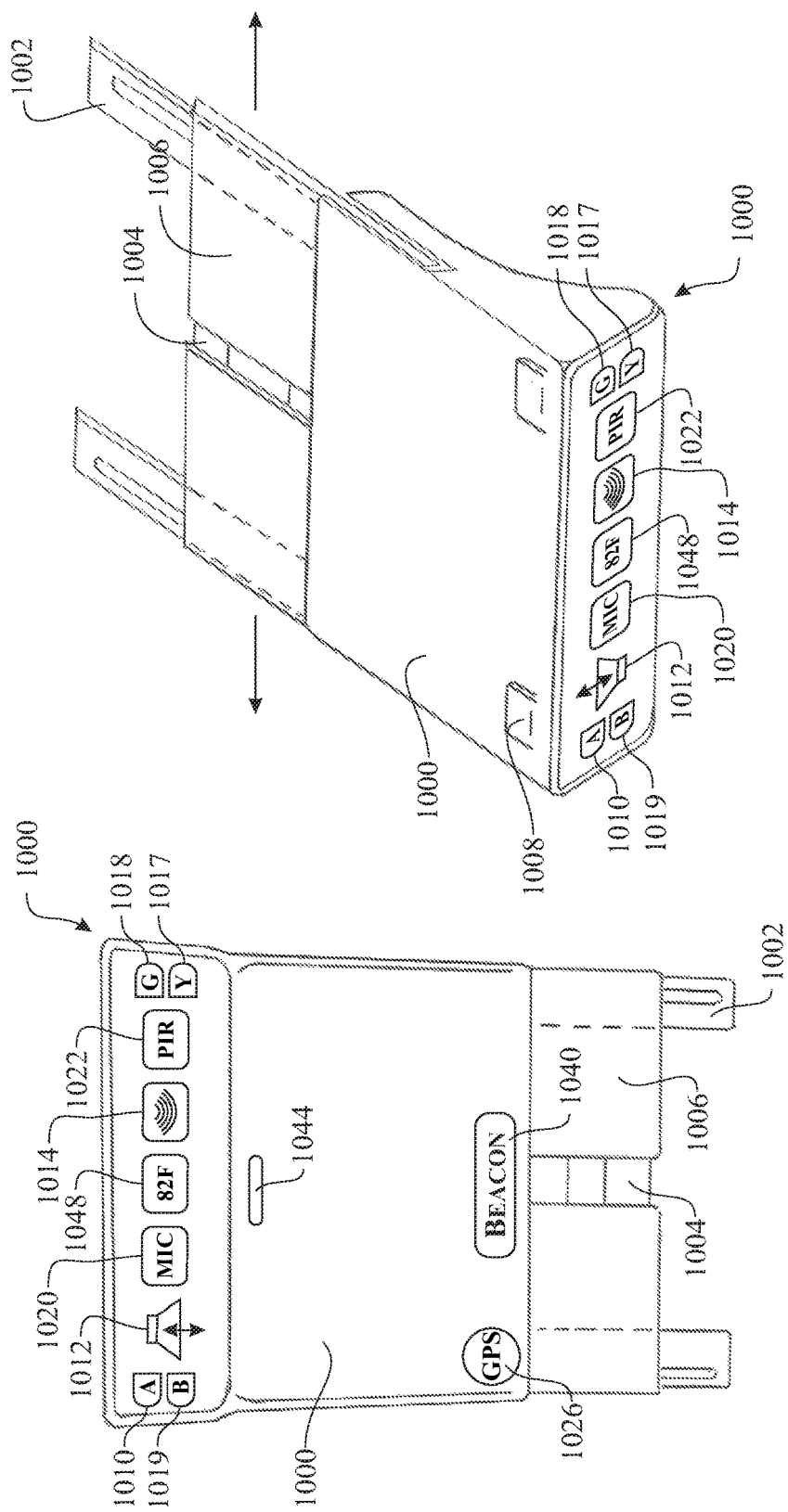

INTELLIGENT VEHICLE OCCUPANCY MONITORING SYSTEM

CROSS-REFERENCE TO RELATED APPLICATIONS

This Non-Provisional Utility Patent Application is a Divisional Patent Application
which claims benefit of U.S. Non-Provisional patent application Ser. No. 15/166,187, filed on May 26, 2016 (scheduled to issue as U.S. Pat. No. 9,845,050),
wherein U.S. Non-Provisional patent application Ser. No. 15/166,187 claims the benefit of U.S. Provisional Patent Application Ser. No. 62/167,267, filed on May 27, 2015, which are all incorporated herein in their entireties.

FIELD OF THE INVENTION

The present invention relates to a system adapted to monitor and take preemptive action for a person and/or an animal that may be accidentally left in a vehicle. More specifically, the system employs a number of sensors to identify when the person and/or the animal is left within the vehicle and when conditions within an interior of the vehicle reach levels of concern for the living entities therein.

BACKGROUND OF THE INVENTION

Several not-for-profit organizations (including but not limited to KidsandCars.org, SafeKids.org, and SaferCar.gov) have been advocating for the development of child safety systems that could potentially save the life a child that was left behind in the vehicle by a parent or caregiver by accident or neglect.

Child death can occur as a result of hyperthermia, heat stress, and/or heat stroke, dehydration or other extreme heat/cold temperature related illnesses resulting from the child being left unattended in vehicles. Since 1998, there have been at least six hundred thirty-six (636) documented cases of child deaths by heatstroke as a result of being left in vehicles. The average number of child vehicular heat stroke deaths per year (since 1998) is thirty-seven (37), one every nine (9) days. In 2014, there were thirty (30) child vehicular heat stroke deaths. Of the six hundred thirty-six (636) documented cased, fifty-three percent (53%) occurred as a result of the parent or caregiver simply forgetting that the child was in the backseat of the vehicle, and then inadvertently leaving and locking the vehicle with the child remaining in the car. Another thirty percent (30%) were a result of children playing and finding their way into unattended hot vehicles and not being able to get out. Astoundingly, another seventeen percent (17%) were due to the parent or caregiver intentionally leaving the child behind, even for just a short period of time, not realizing the severity of their intentions.

Extreme hot/cold conditions cannot only affect children but also pets left behind in vehicles. Extreme temperature changes inside the vehicle can occur over a short period of time, and have life-threatening effects on children or pets left behind in the vehicle. During normal daytime air temperatures (70-90° Fahrenheit) vehicle interior air temperatures can rapidly rise by as much as twenty degrees)(20° (90-110° Fahrenheit) in just the first ten (10) minutes. This rapid change in temperature can have detrimental effects on children and pets that are left behind in the vehicle for even just a short period of time, and can lead to death if they are not removed from the extreme temperatures that increase with each minute.

As global temperatures continue to rise, and extreme hot/cold temperature conditions more readily occur year over year, it is imperative that a solution to this alarming and unnecessary loss of life be developed to prevent and/or mitigate its likelihood.

For reasons described above, there is a need to invent and develop a system for identifying when a person, such as a child, a handicapped individual, a special needs individual, an elderly person, and the like; and/or an animal, such as a pet dog, a pet cat, and the like is left behind in a vehicle in extreme environmental conditions for all cases in which such conditions may develop and takes action to prevent and/or mitigate the likelihood of death therefrom.

BRIEF SUMMARY OF THE INVENTION

The present invention overcomes the deficiencies of the known art and the problems that remain unsolved by providing a method and respective apparatus for monitoring an interior of a vehicle to identify when a person and/or an animal is left within the vehicle and when conditions within an interior of the vehicle reach levels of concern for the living entities therein.

In accordance with one embodiment of the present invention, the invention consists of:
a Bluetooth wireless head unit controller, wherein the Bluetooth wireless head unit controller is located in an overhead region of an interior of the vehicle, preferably located between the front and rear windows near the centerline thereof,
wherein the Bluetooth wireless head unit controller is adapted to communicate with at least one remote Bluetooth sensory device, wherein the Bluetooth sensory device is adapted to acquire sensing data necessary to determine the presence of at least one of a child and a pet inside the vehicle and communicate with the Bluetooth wireless head unit controller.

In a second aspect, the Bluetooth wireless head unit controller can be designed to be attached to a pre-existing rear view mirror, thus locating the Bluetooth wireless head unit controller in the upper centerline position of the front windshield. It is understood that the Bluetooth wireless head unit controller can include any feature or series of features to be secured to the rear view mirror of the vehicle.

In another aspect, the Bluetooth wireless head unit controller can be designed to replace an existing rear view mirror, thus locating the Bluetooth wireless head unit controller in the upper centerline position of the front windshield.

In another aspect, the Bluetooth wireless head unit controller can be adapted to be secured to the driver or passenger side sun visor. This can include a clip enabling a slideable attachment process.

In yet another aspect, the Bluetooth wireless head unit controller can be adapted to be hung or attached to the overhead light or sunroof control console. This can include a clip enabling a slideable attachment process.

In yet another aspect, the Bluetooth wireless head unit controller can be adapted to be hung or attached to a rear portion of a driver's side seat headrest.

In yet another aspect of the present invention, the vehicle controller area network data is in signal communication with the original equipment manufacturer on-board diagnostic adaptor through a Bluetooth wireless remote vehicle controller area network apparatus. This communication link enables the Bluetooth wireless head unit controller to receive vehicle controller area network data to determine the status of a condition of any of one or more vehicle sensors. These conditions include but are not limited to a door lock indication, a door position indication (open or closed), an ignition switch position, an engine speed (commonly monitored in revolutions per minute (RPMs)), a transmission gear position, a driver's side seat belt connectivity status (engaged or disengaged), a passenger's side seat belt connectivity status (engaged or disengaged), a driver's side seat pressure sensor indication, a passenger's side seat pressure indication, and the like. Acquisition of the condition of these variables provide the head unit controller with a general state of the environment to determine a condition of concern and subsequently recommend and direct activation of a warning system, including at least one of an audible warning alarm and visual LED warning light on the head unit controller.

In yet another aspect, the Bluetooth wireless head unit controller can be adapted for attachment to a rear window or alternatively referred to as a rear windshield of the vehicle. The Bluetooth wireless head unit controller would preferably be located in the upper centerline position of the rear window.

In yet another aspect, the Bluetooth wireless head unit controller can include any feature suitable for temporarily or permanently affixing the Bluetooth wireless head unit controller to the interior surface of the rear window (rear windshield) of the vehicle.

In yet another aspect, the system would employ the original equipment manufacturer (OEM) installed alarms and relays through the Bluetooth wireless vehicle controller area network apparatus to cause the vehicle to activate a factory installed audible security alarm, activate the vehicle hazard signal, unlock at least one door, roll down at least one powered window, and any other function to optimize the safety of the person and/or animal within the vehicle.

In yet another aspect, the system would employ factory installed vehicle telematic technologies, such as cellular voice services, cellular data services, wireless local area network (WLAN), etc., to inform at least one of emergency contacts, 24-hr emergency road service responders, 911 emergency services, and the like.

In yet another aspect, the system would employ a global position system (GPS) to determine a location of the vehicle to inform at least one of a parent, a caregiver, emergency responders, and the like of the location of the vehicle in which at least one of a child and a pet has been left unattended, wherein the system has determined that the environmental conditions excess a safe environment.

In yet another aspect, the system would employ at least one micro electro-mechanical sensor, such as a multi-axis gyro-accelerometer motion sensing device attached to the rear seat belt or child restraint seatbelt, wherein the at least one micro electro-mechanical sensor is adapted to detect a presence of a child being placed into a child safety seat, occupying the back seat, or occupying another part of the vehicle.

In yet another aspect, the system would employ at least one micro electro-mechanical sensor, including a multi-axis gyro-accelerometer motion sensing device attached to a pet collar, a pet restraint harness, or any other apparatus contacting the animal, wherein the at least one micro electro-mechanical sensor is adapted to detect the presence of an animal, such as a pet, being placed onto the back seat, occupying the back seat, or occupying another part of the vehicle.

In yet another aspect, the system would employ a force-weight micro sensor attached to an infant safety seat, a child safety seat, or any other seat adapted to carry an individual, wherein the force-weight micro sensor is integrated into the associated seat at a location near a bottom, center area of the seat so as to detect the presence of the person carried by the seat by obtaining measurement of a force or weight.

In yet another aspect, the system would employ a temperature micro sensor, wherein the temperature micro sensor is housed in the head unit controller to monitor and acquire a temperature of the interior of the vehicle. The system would include an instruction set which relies upon an established set of temperature ranges wherein the controller determines a temperature pattern and, when deemed to be appropriate, activates a ramp-up warning and alarm system directed toward a parent, a caregiver, emergency responders, and the like.

In yet another aspect, the system would employ a temperature micro sensor, wherein the temperature micro sensor is housed in the child remote sensor apparatus to monitor and acquire a temperature of the interior of the vehicle at a location near the child located within the infant restraint or restrained by the child seat belt restraint to which the apparatus is attached.

In yet another aspect, the system would employ a temperature micro sensor, wherein the temperature micro sensor is housed in the pet remote sensor apparatus to monitor and acquire a temperature of the interior of the vehicle at a location near the animal wearing the associated collar, pet harness, or other sensor carrying element.

In yet another aspect, the system would employ an audio micro sensor housed in the child monitoring apparatus to provide audible indication of the presence of a child placed within one of an infant restraint or a child car seat, wherein the child monitoring apparatus would be secured to the one of the infant restraint or the child car seat.

In yet another aspect, the system would employ a global position system (GPS) micro sensor housed in the pet monitoring apparatus to provide the location of the animal wearing the pet monitoring apparatus secured to one of the associated collar, pet harness, or other sensor carrying element.

In yet another aspect, the system would employ a pyro-electric infrared (IR) motion detection micro sensor, wherein the pyro-electric infrared (IR) motion detection micro sensor is integrated within the head unit controller. The pyro-electric infrared (IR) motion detection micro sensor identifies any independent motion suggesting a presence of a living entity (at least one of a person or an animal) that has been left unattended within the vehicle. The detected motion can be used in conjunction with environmental sensors to determine if the environment within an interior of the vehicle is approaching or has reached unsafe conditions, in which, the system would then emit an alert and/or an alarm.

In yet another aspect, the system would employ an audio micro sensor housed in the head unit controller to provide independent audible indication of the presence of a child or pet in the vehicle unattended.

In yet another aspect, the system would employ a carbon dioxide sensor. The carbon dioxide sensor would be integrated into the vehicle in a location in a lower region of the vehicle, such as a lower portion of the dashboard or a position located proximate the floor.

In yet another aspect, the carbon dioxide sensor is integrated into the vehicle and in non-transient digital data communication with at least one of the child safety monitoring apparatus and the head unit controller.

In yet another aspect, the carbon dioxide sensor is integrated into the child safety monitoring apparatus.

In yet another aspect, the controller determines a presence of a child or pet within the vehicle by monitoring a level of carbon dioxide within the vehicle.

In yet another aspect, the controller determines a presence of a child or pet within the vehicle by monitoring a change in the level of carbon dioxide within the vehicle.

In yet another aspect, the system would employ the vehicle 12-volt battery power supply to provide power to the remote wireless controller area network apparatus connected to the vehicle on-board diagnostic receptacle.

In yet another aspect, the system would employ a suitable portable power supply such as a rechargeable power source to provide power to operate the head unit controller, child weight sensing apparatus, and child or pet safety monitoring apparatus. The head controller unit, child weight sensing apparatus, and child and pet safety monitoring apparatus contain a low battery warning LED light to warn the user to recharge or replace the battery sources. Examples of a suitable portable power supply include a Lithium Ion battery, a Lead Acid battery, a super capacitor, a solar energy converter, a motion energy converter, and the like.

In yet another aspect, the system would employ at least one alternate energy-harvesting power supply source including solar or photovoltaic cells attached to the head unit controller that capture and store energy for recharging the battery or providing alternate power to operate the apparatus so as to prolong the lifetime of the batteries.

In yet another aspect, the system would employ radio frequency (RF) emission available from an installed Wi-Fi transponder housed within the remote vehicle controller area network apparatus, to provide RF energy to the alternate energy harvest power transceiver modules housed in the head unit controller, child weight sensing apparatus, and child or pet safety monitoring apparatus, for harvesting and converting RF energy to electric power for battery-less operation of the low-energy microcontroller and micro sensors, and for recharging and prolonging the lifetime of the battery.

In yet another aspect, the system would utilize a portable electronic computing device application (such as those designed for Smartphones, portable computing tablets, and the like), wherein the portable electronic computing device application is adapted to receive warnings and alarms wirelessly from the head unit controller to inform the parent or caregiver of the presence of at least one of a child and a pet that is detected as being left unattended in the vehicle.

In yet another aspect, the system would utilize Bluetooth wireless signal strength measurements to determine the proximity or distance between the mobile device and the head unit controller to trigger or initiate the alarm indications and/or the warning indications to be sent wirelessly to the mobile phone or portable electronic device application, upon exceeding predetermined tripwire ranges from the vehicle, if at least one of a child and a pet has been detected as being left unattended in the vehicle.

In yet another aspect, the system would utilize Bluetooth wireless signal strength measurements to determine the proximity or distance between a key chain FOB and the head unit controller to trigger or initiate the alarm and/or the warning indications to be sent wirelessly to the key chain FOB, upon exceeding predetermined tripwire ranges from the vehicle, if at least one of a child and a pet has been detected as being left unattended in the vehicle.

In yet another aspect, the system would utilize vehicle telematic technologies, such as cellular voice services, cellular data services, wireless local area network (WLAN), etc., to convey the location of the vehicle determined by a global positioning system (GPS) and to subsequently communicate the acquired location to at least one of a 24-hour emergency service provider, an emergency contact, and an emergency responder to alert such of a condition where at least one of a child and a pet has been detected as being left unattended in the vehicle and more so the at least one of the child and the pet are currently exposed to an environment that may impose a life-threatening condition.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIGS. 8A and 8B present a schematic diagram illustrating an exemplary remote vehicle controller area network apparatus, wherein FIG. 8A illustrates an operational portion of the exemplary remote vehicle controller area network apparatus and FIG. 8B illustrates a power harvesting section of the system, wherein the power harvesting modules housed in the head unit controller, remote child weight sensing apparatus, and child and pet safety monitoring apparatus receive RF energy via the Wi-Fi transmitter section of the remote vehicle controller area network apparatus;

FIG. 18 presents a front view of an exemplary head unit controller apparatus adapted for placement over a rear view mirror;

FIG. 19 presents a rear view of the head unit controller apparatus originally introduced in FIG. 18;

FIG. 22 presents a bottom view of an exemplary head unit controller apparatus adapted for attachment to an overhead element within a vehicle interior; and FIG. 23 presents an isometric view of the exemplary head unit controller apparatus originally introduced in FIG. 22.

Like reference numerals refer to like parts throughout the several views of the drawings.

DETAILED DESCRIPTION OF THE PRESENT INVENTION

Figure 1:
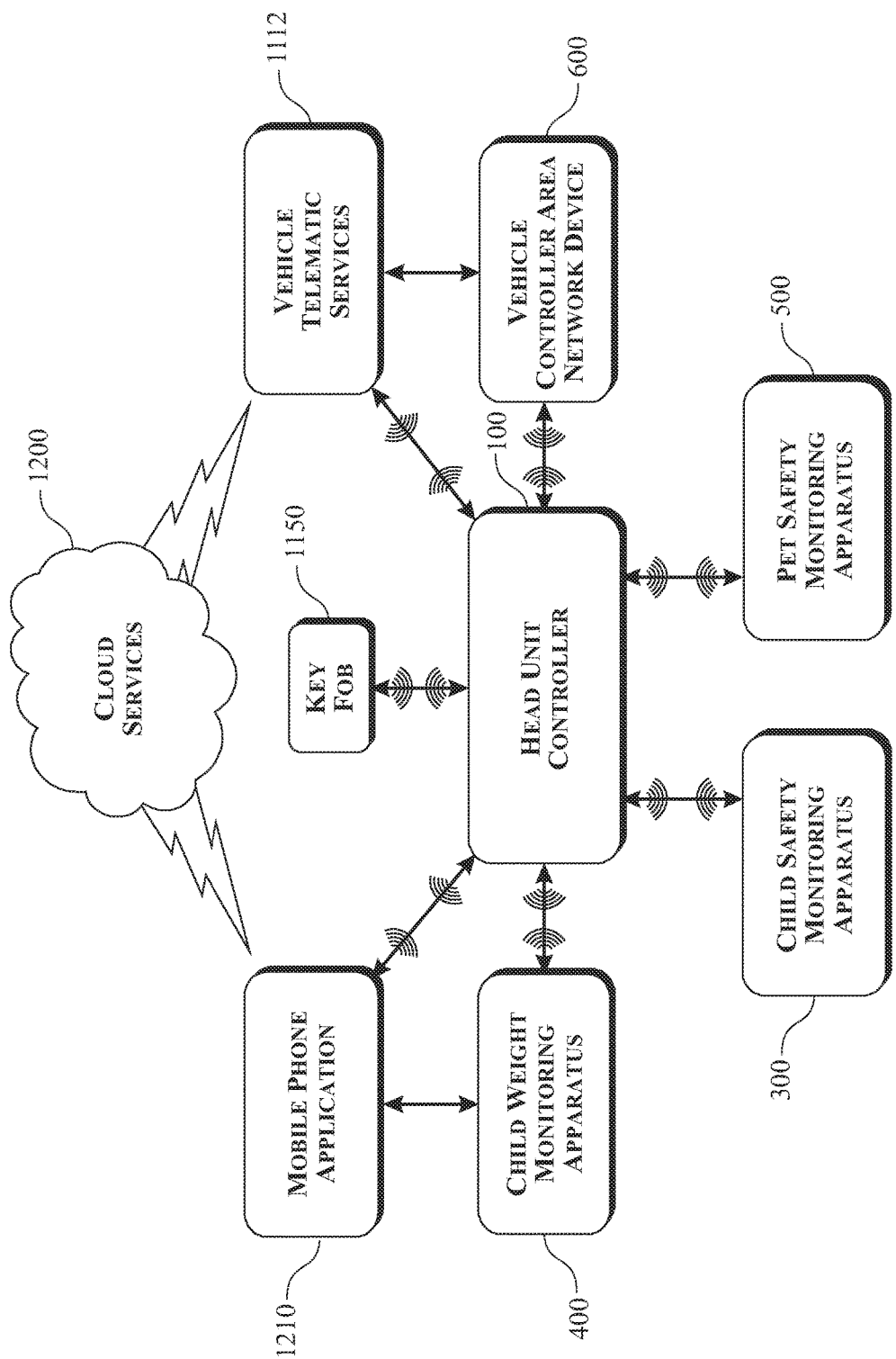
FIG. 1 presents a block diagram illustrating an exemplary multi-component wireless communication network comprising a Bluetooth head unit controller, a wireless child monitoring apparatus, a wireless pet monitoring apparatus, a Smartphone application, a vehicle telematic technology center, a vehicle controller area network data source, and a cloud communication service.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An apparatus and method for delivering real-time notifications and alarms to parents and emergency responders to prevent or mitigate the likelihood of the loss of life of a child or pet left behind in a vehicle under extreme environmental conditions is described. In many instances, structures and devices well known to users trained in the art of the invention are shown in block diagram form in order to avoid unnecessarily obscuring the invention. The inventions described with respect to the child sensory apparatus are applied to various examples of car seats but may be also applied to other child carriers such as strollers, carriages, booster seats, and other portable child restraint devices or carriers. The invention described with respect to the pet monitoring apparatus is applied to an example using a pet collar, but it is understood that the pet monitoring apparatus may be also used in conjunction with pet restraints, leashes, or other forms of pet collar devices. Furthermore, while various exemplary diagrams and schematics pertain to the detection of proximity (range or distance) by way of Bluetooth signal strength measurements or global positioning techniques, it is contemplated that any data protocols, methodologies or systems for supporting range or location based services are applicable. Specific dimensions and other physical characteristics relating to the embodiments disclosed herein are not to be considered as limiting, unless the claims expressly state otherwise.

A general outline of interactions between various components to create a monitoring and alerting system is illustrated in FIG. 1. A block diagram illustrating an exemplary integrated wireless communication network between a Bluetooth head unit controller 100 and at least one of a wireless child safety monitoring apparatus 300, a child weight sensing apparatus 400, a pet safety monitoring apparatus 500, a portable computing device application 1210, vehicle telematics services 1112, a vehicle controller area network apparatus 600, cloud based services 1200, and the like. It is noted that the wireless child safety monitoring apparatus 300, the child weight sensing apparatus 400, and the pet safety monitoring apparatus 500 can be collectively referred to as remote monitoring apparatus. The head unit controller assembly 100 communicates wirelessly via Bluetooth wireless protocols with a child safety monitoring apparatus 300, child weight sensing apparatus 400, remote pet safety monitoring apparatus 500, and remote vehicle controller area network apparatus 600. The head unit controller assembly 100 delivers real-time warnings, notifications, and alarms to parents, caregivers, pet owners, and the like using the associated portable computing device application 1210, a key FOB 1150, vehicle telematic services 1112, or any other suitable conveyance device, wherein the information is transmitted over a Bluetooth wireless message. Cloud based services 1200 maintains reliable, secure caregiver and emergency contact data 1234 (FIG. 2), and would be adapted to deliver real-time warnings, notifications, and alarms to portable computing devices employing the associated mobile phone application 1210, vehicle telematic services 1112, or any other communication recipient.

The system is adapted to monitor an interior of a vehicle to identify a presence of a living entity and provide one or more appropriate actions upon determination of the presence of the living entity. The system utilizes the head unit controller assembly 100 as the primary controller therefore. The head unit controller assembly 100 is provided in signal communication with at least one of the child safety monitoring apparatus 300, child weight monitoring apparatus 400, pet safety monitoring apparatus 500, and the like to obtain a presence of a living entity within the vehicle. The head unit controller assembly 100 can be activated upon exceeding any of: predetermined set points, tripwire range, and programmed logic milestones. Activation of the head unit controller assembly 100 would subsequently establish signal communication with at least one of the key FOB 1150 and a Smartphone running an associated system application 1210. The head unit controller assembly 100 includes a proximity circuit adapted to determine when at least one of the associated key FOB 1150 and the associated Smartphone 1210 is moved beyond the signal tripwire range therefrom. Once at least one of the associated key FOB 1150 and Smartphone 1210 is moved beyond the signal tripwire range therefrom, the head unit controller assembly 100 would initiate an alert process to alert a predetermined party of an impending potentially dangerous situation.

The vehicle telematic services 1112 could also be directed to send one or more messages to a predetermined recipient to alert the predetermined recipient of an impending dangerous condition with a goal of obtaining aid to the living entity. The head unit controller assembly 100 can be provided in signal communication with the vehicle controller area network device 600 to obtain information associated with the vehicle, such as a status of doors, an engine, windows, and the like and would be capable of directing activation of one or more actuators, such as a window actuator, a door lock actuator, and the like. The system can further employ a wireless transmission system adapted for a transfer of alternative power sources, such as radio frequency (RF) energy, from a transmitting device to a receiving device, wherein the receiving device would convert the transmitted radio frequency (RF) energy into electrical energy for use, thus allowing operation of any of the remote monitoring devices 300, 400, 500, exclusive of a portable power supply, such as a battery.

Figure 2:
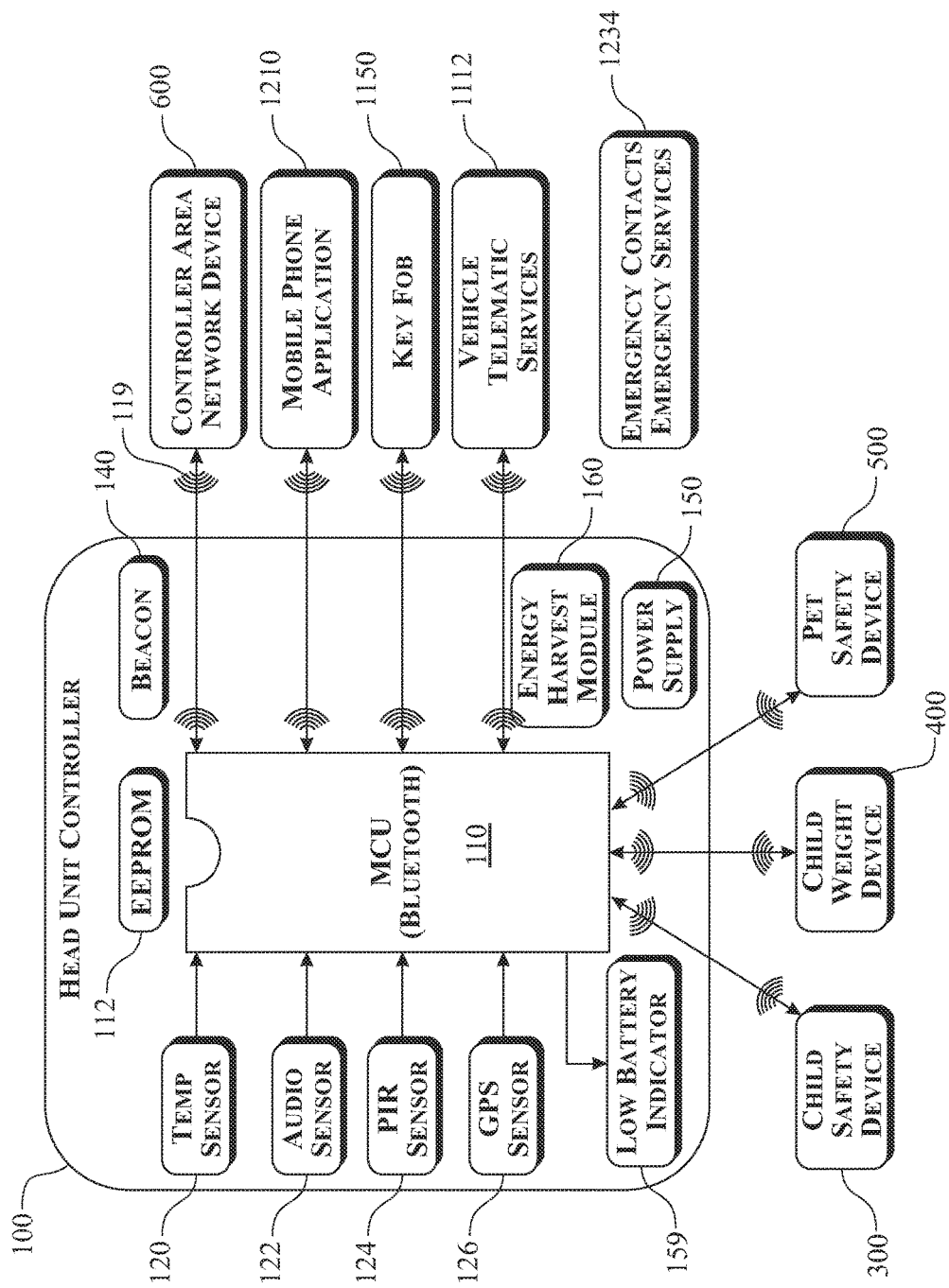
FIG. 2 presents a schematic diagram illustrating an exemplary head unit controller.

An exemplary head unit controller assembly 100, introduced in FIG. 2, includes a printed circuit board, supporting electronic components, at least one micro electro-mechanical sensor 120, 122, 124, 126, a wireless communication circuit (such as a Bluetooth communication transceiver) and at least one Bluetooth communication link provided between the head unit controller assembly 100 and at least one monitoring device 300, 400, 500, 600, 1112, 1150, 1210. The head unit controller assembly 100 includes at least one microprocessor 110 for executing programmed logic and at least one electrically erasable programmable read-only memory (EEPROM) 112 for storing data acquired from the at least one micro electro-mechanical sensor 120, 122, 124, 126. More specifically, the at least one micro electro-mechanical sensor 120, 122, 124, 126 can include a local ambient temperature sensor 120, an audio sensor 122, a pyro-electric infrared (IR) motion detection micro sensor 124, and a global position system (GPS) locating circuit 126 to independently monitor conditions within an interior of a vehicle and provide corresponding acquired data to the microprocessor 110 and EEPROM 112 for storage of data and delivery of notification and actions based on the programmed logic. The head unit controller assembly 100 receives data acquired from the at least one micro electro-mechanical sensor 120, 122, 124, 126 via the Bluetooth wireless communication link 119 from the child safety monitoring apparatus 300, the child weight sensing apparatus 400, the pet safety monitor apparatus 500, the vehicle controller area network apparatus 600, and any other data source integrated into the system. The head unit controller assembly 100 orchestrates ramp-up warning and action signals according to the programmed intelligent logic, and delivers warnings and alarms to a mobile phone application 1210 and key FOB 1150 upon indications of at least one of a child or a pet has been determined to have been left behind in the vehicle 1100 (FIG. 9) by a parent, a caregiver, a pet owner, or any other individual as well as when at least one condition within an interior of the vehicle 1102 (FIG. 9) is determined to be potentially harmful or dangerous to life. The microprocessor 110 can also deliver action commands to the vehicle controller area network apparatus 600 to activate at least one of: a factory installed vehicle security alarm 1134 (FIG. 11) vehicle hazard lights 1130, vehicle interior lights 1132, motor actuators to open door locks 1140, window actuators to roll down power windows 1142, or any other life saving supporting task to gain the attention of others located nearby the vehicle 1100 (FIG. 9) and assist in accessing the vehicle interior 1102 to remove the child or the pet from dangerous conditions within the vehicle interior 1102.

Figure 11:
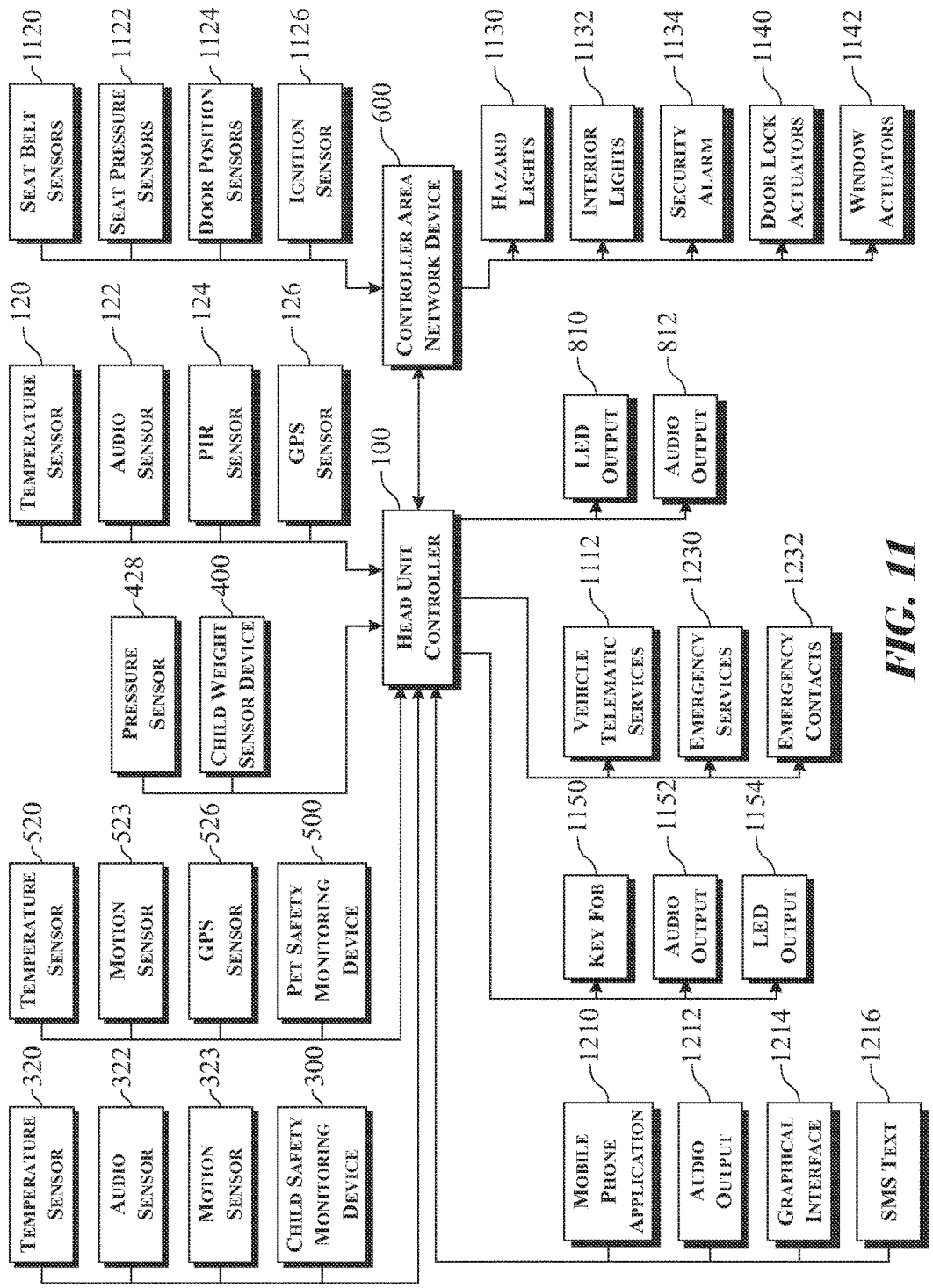
FIG. 11 presents a flowchart illustrating a series of exemplary head unit controller input and output functions associated with the present invention.

The microprocessor 110 monitors distance (range) between the head unit beacon 140 and the mobile phone application 1210 or the key FOB 1150. Upon exceeding pre-programmed distance (range) tripwires stored in the EEPROM 112, the microprocessor 110 delivers notification and alarms to the parent or pet owner via Bluetooth to the key FOB 1150. An alarm integral with the key FOB 1150 and notification includes a key FOB audible output 1152 (such as a vibrating buzzer) (FIG. 11) and a key FOB visual output 1154 (FIG. 11) (such as blinking LED lights). Additionally, the microprocessor 110 also delivers warnings, notifications, and alarms to the respective parent, caregiver, pet owner, or any other party using the mobile phone application 1210 installed on a mobile phone or any other portable electronic device capable of receiving notifications and alarms. The mobile phone application alarms and notification message can include any of a Short Message Service (SMS) text message 1216 (FIG. 11), portable computing device audible warning output 1212 (FIG. 11), a presentation of current or trending vehicle interior temperature data, as well as inclusion of action buttons or icons, graphics, or a combination thereof preferably presented in a format of a portable computing device graphical user interface (GUI) 1214 (FIG. 11).

Should the parent or caregiver fail to return to the vehicle to remove the child or pet from danger as requested by the warnings and alarms delivered to the mobile phone application 1210, the key FOB 1150, or any other suitable receiving device, or conditions inside the vehicle worsen such as reaching temperatures that exceed pre-programmed set points stored in the electrically erasable programmable read-only memory (EEPROM) 112; the microprocessor 110 subsequently would convey alarms and notification messages to vehicle telematic services 1112 to alert at least one of emergency contacts 1232 (FIG. 11), and 9-1-1 emergency services 1230 (FIG. 11), or any other emergency condition responder (collectively identified as emergency contacts and 9-1-1 emergency services (1234) (FIG. 2)) of the detected presence of at least one of a child or a pet left behind in a vehicle currently exhibiting potentially life-threatening environmental conditions. Vehicle telematic alarms and notification messages include emergency contact information, a global position system (GPS) location of the vehicle, temperature conditions within an interior 1102 of the vehicle 1100, and a length of time in which the detected presence of the living entity (at least one of a child or a pet) has been exposed to the life-threatening environmental conditions inside 1102 the vehicle 1100.

There could be instances where a living entity could make their way into the vehicle 1100 without the parent, caretaker, or pet owners' knowledge and become trapped, or locked therein. The trapped living entity would be without knowledge, skills or tools to enable them to exit the vehicle 1100. Many newer model vehicles 1100 include factory installed 'child door locks' making it impossible to open the backseat doors from the interior 1102 the vehicle 1100, leaving the child or pet (knowing and/or unknowingly) subjected to life-threatening environmental conditions without capability to exit the vehicle. In such cases, the head unit controller assembly 100 is adapted to independently sense motion and audio signals to detect the presence of a child or pet in the vehicle as well as an ability to determine a temperature of the interior 1102 of the vehicle 1100, as well as a capability to determine a location of the vehicle or more specifically, a global position system (GPS) location. Motion can be determined using any motion detecting sensor, such as a pyro-electric infrared (IR) motion detection micro sensor 124. Sound, such as a child's voice, cries, screams, or a pet's barking, whining, and howling can be detected using an audio sensor 122. A temperature within the vehicle interior 1102 can be monitored using a proximal ambient air temperature sensor 120. The head unit controller assembly 100 can deliver notification and alarms to parents, caretakers, pet owners, and the like using any suitable wireless communication, such as a Bluetooth wireless communication link 119 to the mobile phone application 1210, the key FOB 1150, emergency contacts 1232 and 9-1-1 emergency services 1230 via vehicle telematics services 1112 to engage outside assistance to remove the child or pet from the vehicle 1100, thus mitigating any likelihood of injury or death.

The head unit controller assembly 100 receives factory installed vehicle sensory data through a remote vehicle controller area network apparatus 600 connected to the vehicle on-board diagnostic connector 1116. The controller area network data includes, but is not limited to, a door lock indication, a door position indication (open or closed), an ignition switch position, an engine speed (generally provided in revolutions per minute), a transmission gear position, a driver's side seat belt status (engaged or disengaged), a passenger's side seat belt status (engaged or disengaged), a driver's side seat pressure sensor state, and a passenger's side seat pressure state. These indications are used to activate the head unit microprocessor 110 to monitor the vehicle interior 1102 for indications of a presence of at least one of a child or a pet within the vehicle 1100. The system also includes a capability to determine the likelihood of a presence of a parent, a caretaker, a pet owner, or any other suitable individual in the driver's seat or passenger's seat during operation of the vehicle 1100 or the likelihood of the same exiting the vehicle.

The vehicle controller area network apparatus 600 can also receive signals from the head unit microprocessor 110 by way of a Bluetooth wireless communication link 119 to operate factory installed relays, including those employed to unlock doors, roll down power windows, sound a security alarm, activate hazard warning lights, and operate any other motorized components and devices inside the vehicle by way of the controller area network.

The head unit controller power supply 150 can employ a suitable portable power supply, represented by a rechargeable 9V Lithium Ion battery 154 (FIG. 3), and can also receive power to operate the micro devices via an alternative head unit controller energy harvest module 160. The head unit controller energy harvest module 160 includes components that can convert solar energy, radio frequency (RF) energy, motion, and the like into electrical power, providing an output current 158. The head unit controller assembly 100 contains a low battery indicator 159 to alert the user that a power level of the portable power supply 154 needs to be recharged or replaced.

Figure 3:
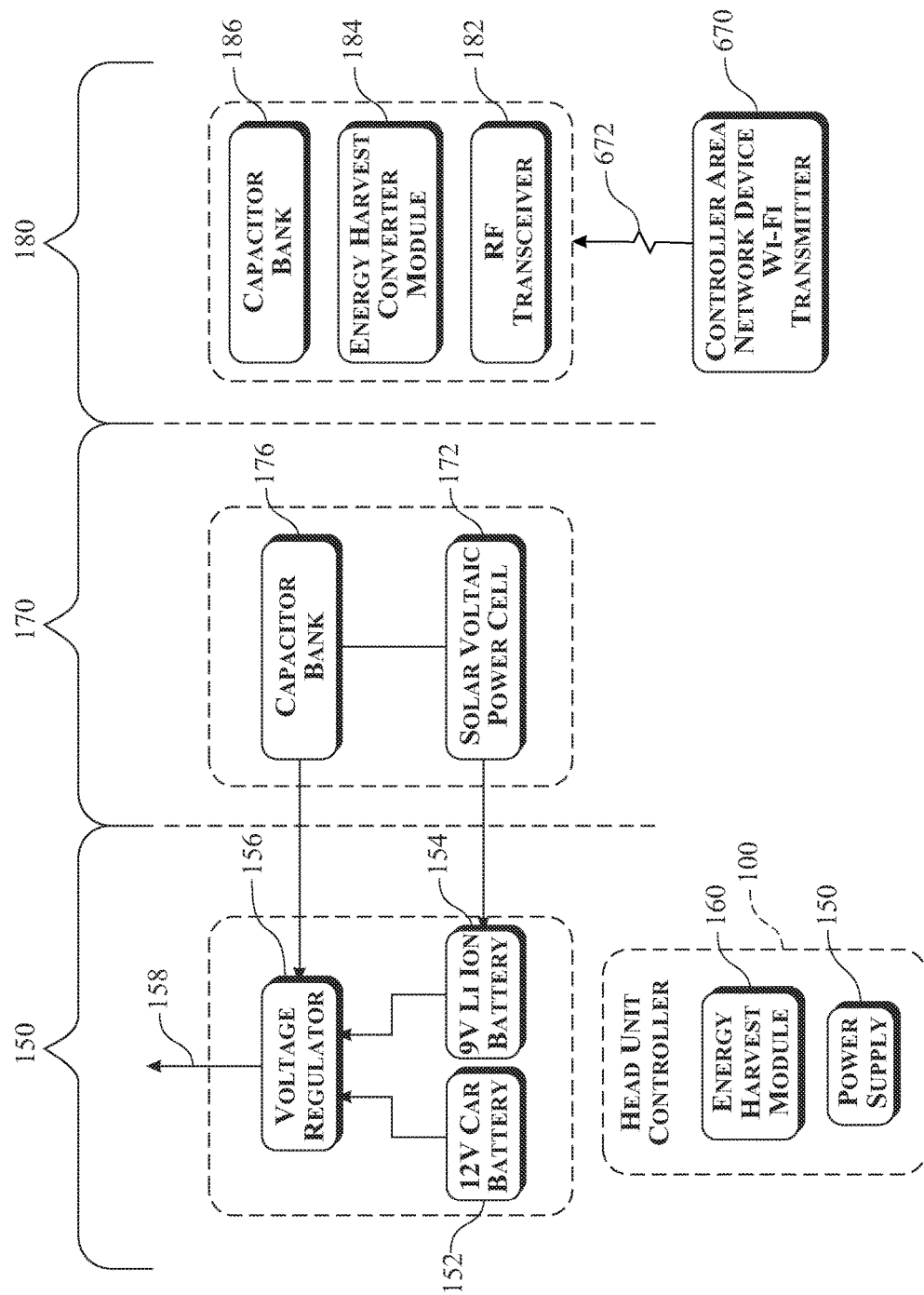
FIG. 3 presents a schematic diagram illustrating an exemplary power supply and alternate energy harvesting module options for supplying power to the head controller unit.

Three exemplary power configurations are presented in FIG. 3, including a head unit controller power supply 150, a first external power source 170, and an exemplary energy harvest module 180. The first external power source 170 and the energy harvest module 180 are used to power the head unit controller assembly 100 and recharge a 9V Lithium Ion battery 154.

More specifically, the exemplary head unit controller power supply 150 utilizes a voltage regulator 156 that receives DC voltage from either a 9-volt Lithium Ion rechargeable battery 154 or a factory installed 12-volt vehicle battery 152, and converts the voltage to approximately a 5 volt direct current output 158 to power the head unit controller assembly 100.

The first external power source 170 utilizes a photovoltaic power cell 172 and capacitor bank 176 to acquire and store energy, which is used to recharge the 9-volt Lithium Ion rechargeable battery 154 or supplement power to the head unit controller through the voltage regulator 156.

The second exemplary power source or head unit controller energy harvest module 180 utilizes a radio frequency (RF) transceiver 182 for collecting a signal transmitted over a Wi-Fi radio frequency (RF) communication link 672 from a remote vehicle controller area network Wi-Fi transceiver 670. The RF energy collected by the radio frequency (RF) transceiver 182 is transformed into electrical energy by the energy harvest converter module 184, wherein the collected electrical energy is stored within an energy harvest capacitor bank 186, which transfers the collected energy to either the 9-volt Lithium Ion rechargeable battery 154 and/or the power supply voltage regulator 156 to operate the head unit controller assembly 100.

Figure 4:
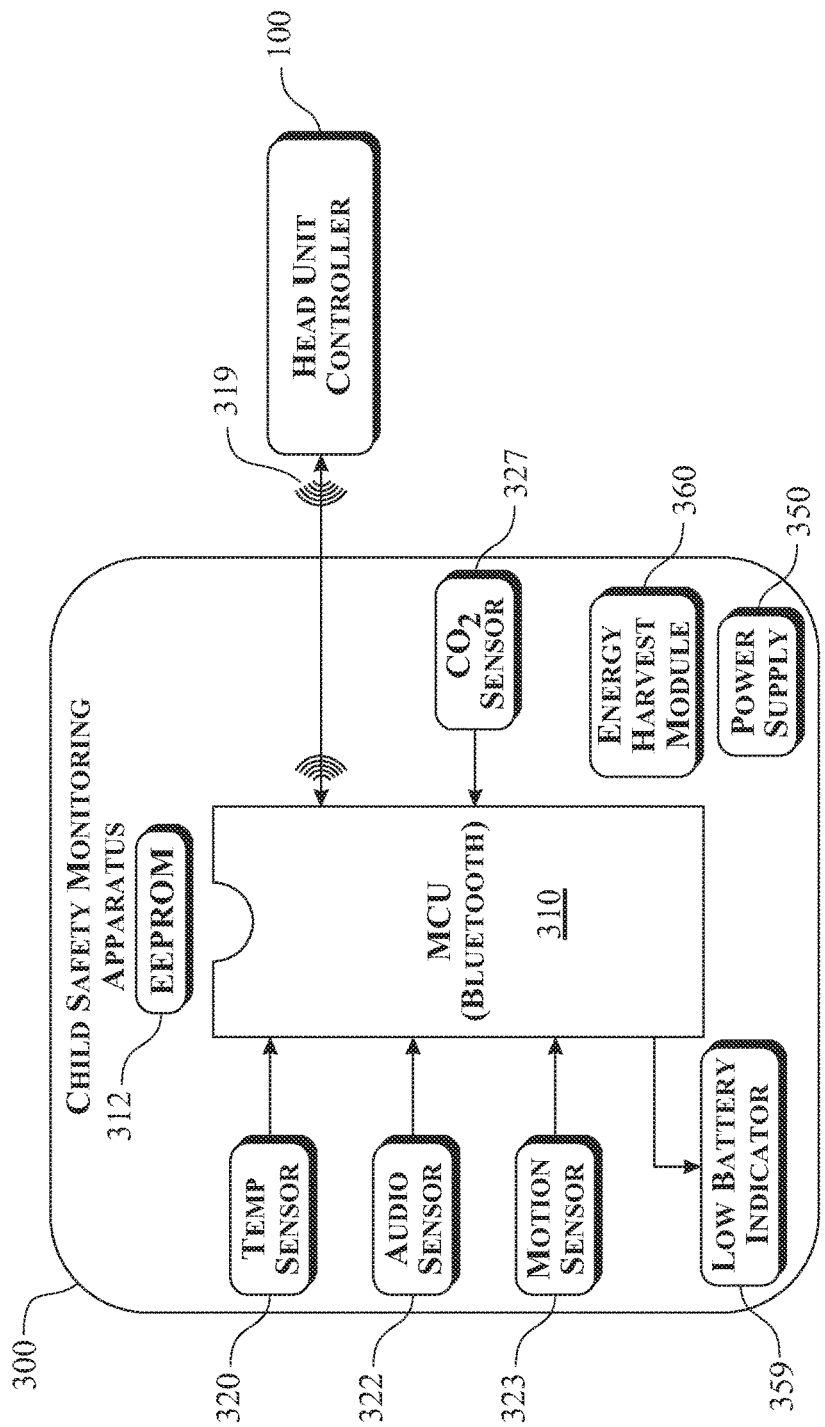
FIG. 4 presents a schematic diagram illustrating an exemplary child safety monitoring apparatus.

An exemplary child safety monitoring apparatus 300 is illustrated as a schematic diagram in FIG. 4. The child safety monitoring apparatus 300 includes a printed circuit board, supporting electronic components, at least one microprocessor 310 for executing the programmed logic design, at least one electrically erasable programmable read-only memory (EEPROM) 312 for storing sensory data, and any other suitable functional components. The child safety monitoring apparatus 300 also contains a proximal environment temperature sensor 320, an environment audio sensor 322, a gyro-accelerometer motion sensor 323, and a carbon dioxide ($CO_2$) sensor 327 to independently monitor and detect the presence of a child in one of an infant/child child seat 720 (FIG. 14) or a booster child seat 710 (FIG. 12), to which the child safety monitoring apparatus 200, 300 is attached (clipped on, or adhered to). Corresponding properties monitored and collected by the sensors 320, 322, 323 are collected by the microprocessor 310 and electrically erasable programmable read-only memory (EEPROM) 312 for storage and delivery to the head unit controller assembly 100 using a Bluetooth wireless communication link 319 for action. When integrated into the child safety monitoring apparatus 300, levels of carbon dioxide ($CO_2$) can be monitored to determine the presence of the child in one of the infant/child child seat 720 or the booster child seat 710. Although the carbon dioxide ($CO_2$) sensor 327 is shown being integrated into the child safety monitoring apparatus 300, it is understood that the carbon dioxide ($CO_2$) sensor 327 can be integrated into the head unit controller 100 introduced in FIG. 2, integrated into the vehicle and arranged in non-transient analog or digital data communication with the child safety monitoring apparatus 300, or in any other suitable configuration. The alternative installations of the carbon dioxide ($CO_2$) sensor 327 introduces a broader monitoring capability of the vehicle enabling monitoring for children, adults, pets, and the like.

Figure 7:
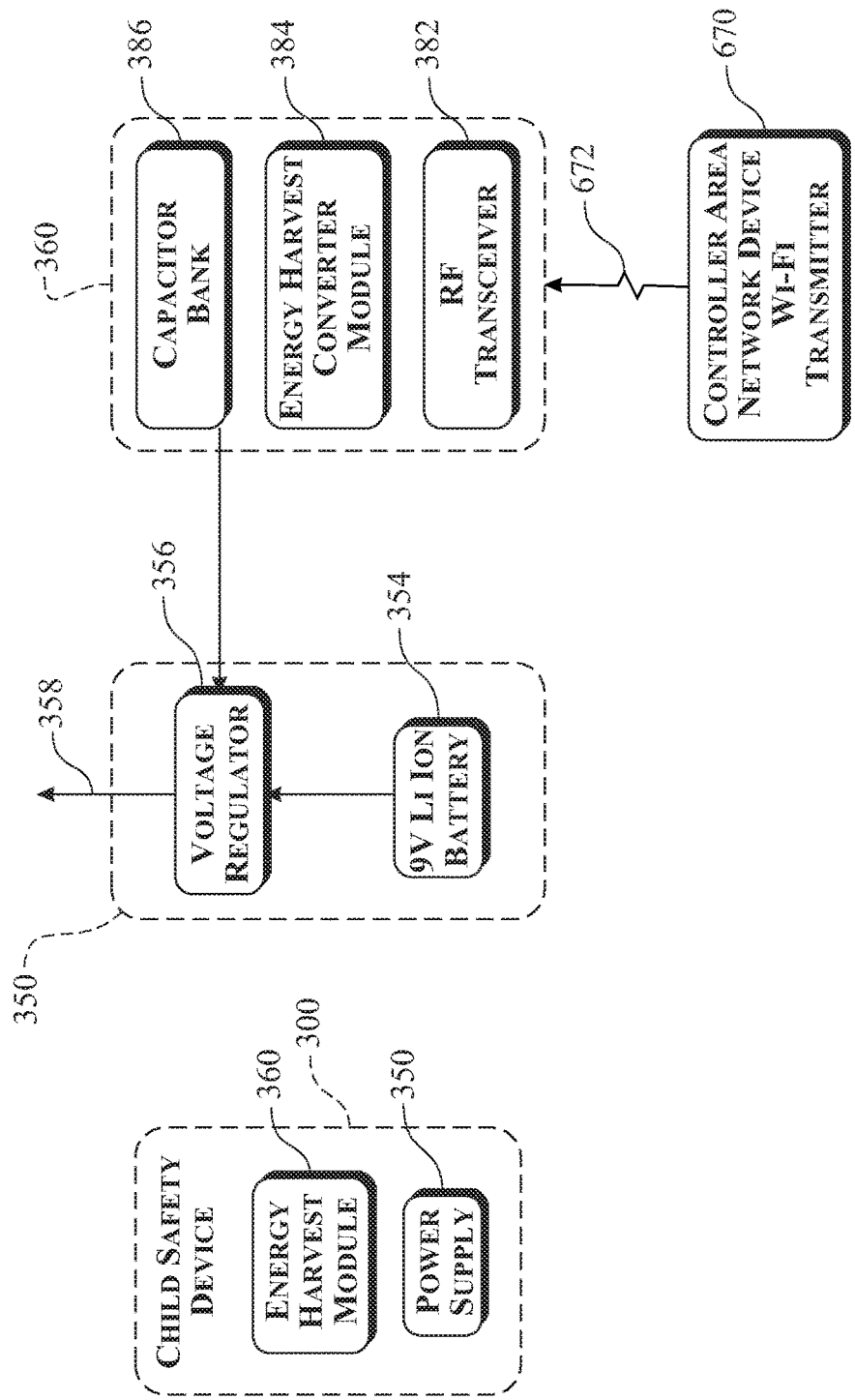
FIG. 7 presents a schematic diagram illustrating an exemplary power supply and alternate energy harvesting module option utilized by the child safety monitoring apparatus, child weight sensing apparatus, and pet safety monitoring apparatus.

The levels of carbon dioxide ($CO_2$) would be acquired using the carbon dioxide ($CO_2$) sensor 327. The system can monitor the level of carbon dioxide ($CO_2$), a change in the level of carbon dioxide ($CO_2$), a combination thereof, or any other method using the acquired carbon dioxide ($CO_2$) levels to determine the presence of children, adults, pets, and the like. The child safety monitoring apparatus power supply 350 can utilize a 9-volt Lithium Ion type rechargeable battery 354 (FIG. 7). The child safety monitoring system energy harvest module 360 converts radio-frequency (RF) to electrical energy for storage and use through the child safety monitoring apparatus power supply 350 for life-long battery-less operation. A low battery indicator 359 can be included to alert the user to recharge or replace the power supply 350.

Figure 5:
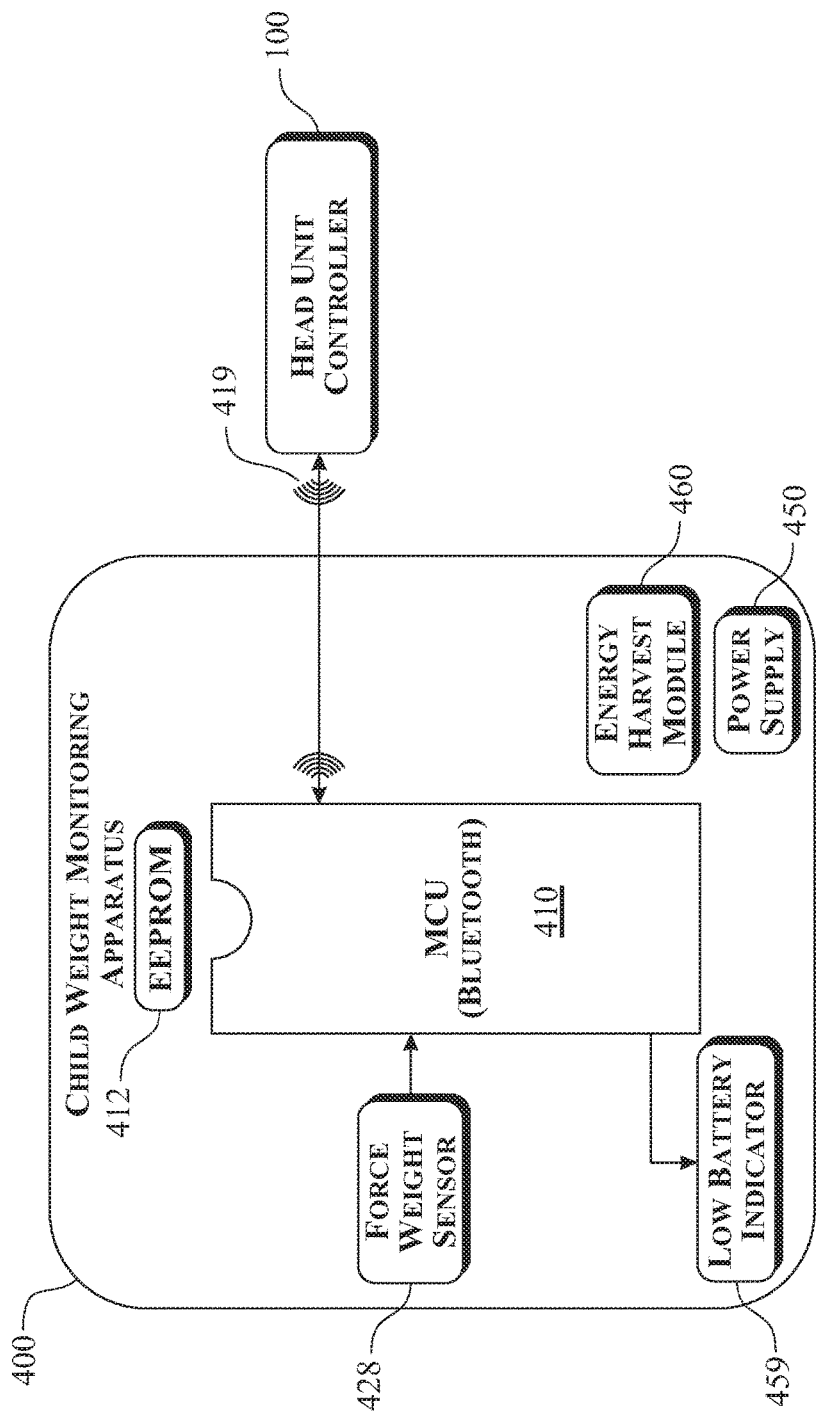
FIG. 5 presents a schematic diagram illustrating an exemplary child weight sensing apparatus.

An exemplary remote child weight sensing apparatus 400 is presented in schematic format in FIG. 5. The remote child weight sensing apparatus 400 includes at least one microprocessor 410 and one electrically erasable programmable read-only memory (EEPROM) 412 for storing sensory data and executing the programmed logic design. The child weight sensing apparatus 400 utilizes a force sensor 428 to detect a presence of a child seated within one of the infant/child car seat 720 (FIG. 14) or the booster child seat 710 (FIG. 12) having the remote child weight sensing apparatus 400 integrated therein. Force data is collected by the microprocessor 410 and stored within the electrically erasable programmable read-only memory (EEPROM) 412, then delivery to the head unit controller assembly 100 through a Bluetooth wireless communication link 419 for action.

The child weight sensing apparatus 400 can utilize a 9-volt Lithium Ion type rechargeable battery 154 as a child weight sensor power supply 450. A child weight sensing apparatus energy harvest module 460 converts radio-frequency (RF) energy to electrical energy for storage and use through the child weight sensor power supply 450 for life-long battery-less operation. A low battery indicator 459 can be included to alert the user to recharge or replace the power supply 450.

Figure 6:
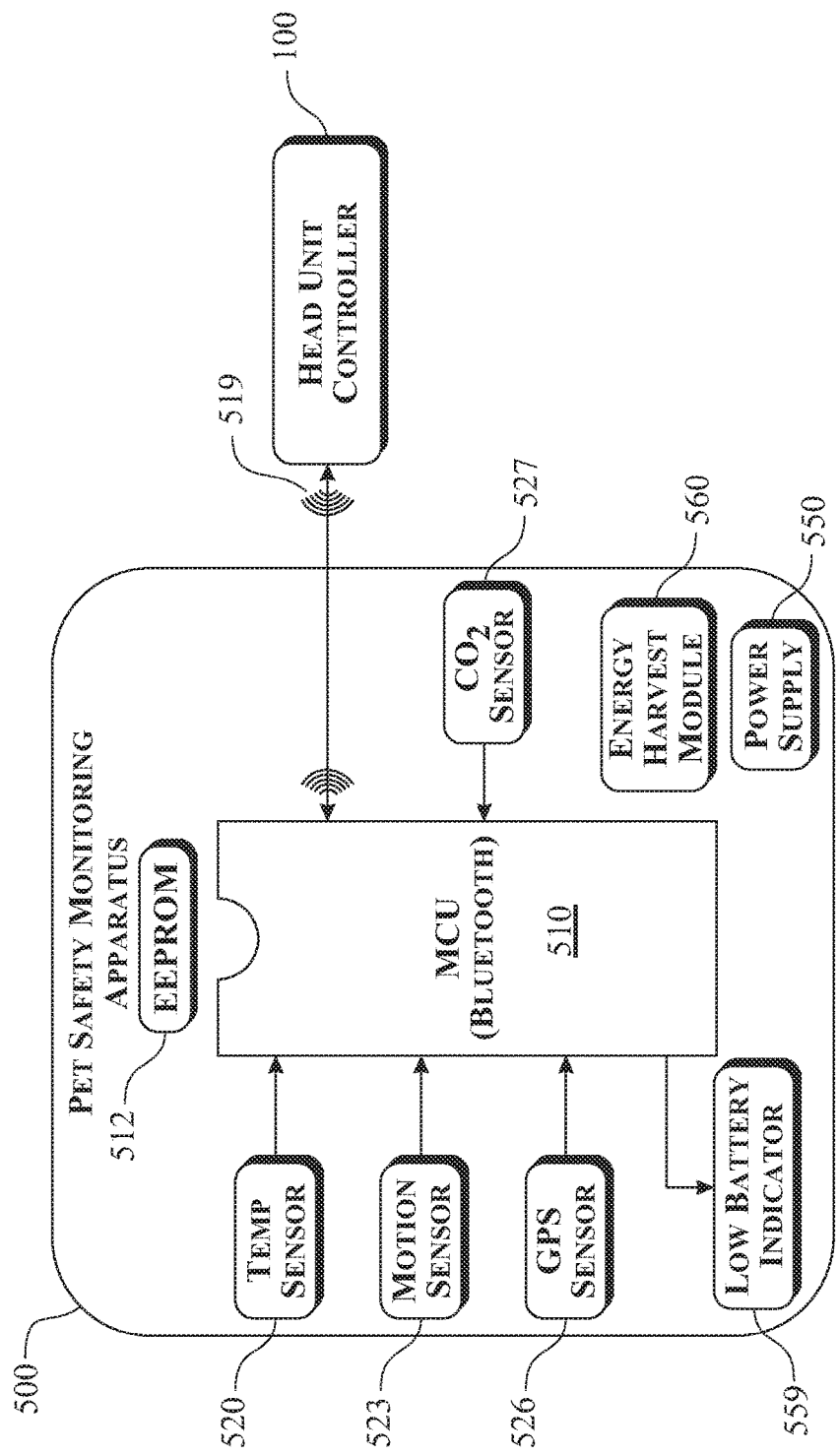
FIG. 6 presents a schematic diagram illustrating an exemplary pet safety monitoring apparatus.

An exemplary pet safety monitoring apparatus 500 is presented in schematic format in FIG. 6. The pet safety monitoring apparatus 500 includes at least one microprocessor 510 for executing the programmed logic design and one electrically erasable programmable read-only memory (EEPROM) 512 for storing sensory data. The pet safety monitoring apparatus 500 also contains a proximal environment temperature sensor 520, a gyro-accelerometer motion sensor 523, and a global position system (GPS) locating circuit 526 to independently monitor and detect the presence of a pet in the vehicle. For operation, the pet safety monitoring apparatus 500 would be attached (clipped on, adhered to) to a component (such as a pet collar 241) (FIG. 16) worn by the pet during use. Corresponding data monitored by the associated sensors 520, 523, 526 are collected by the microprocessor 510 and stored within the electrically erasable programmable read-only memory (EEPROM) 512, then subsequently delivery to the head unit controller assembly 100 using a Bluetooth wireless communication link 519 for action. The pet safety monitoring apparatus 500 can optionally include a carbon dioxide ($CO_2$) sensor 527, which would function in a manner similar to the carbon dioxide ($CO_2$) sensor 327 described above.

The pet unit power supply 550 utilizes a 9-volt Lithium Ion type rechargeable battery 154. A pet safety monitoring system energy harvest module 560 converts radio-frequency (RF) energy to electrical energy for storage and use through the pet unit power supply 550 for life-long battery-less operation. A low battery indicator 559 can be included to alert the user to recharge or replace the power supply 550.

An exemplary child safety monitoring apparatus power supply 350 and an energy harvest module 360 for a child safety monitoring apparatus 300 is illustrated in a schematic diagram format in FIG. 7. The exemplary power supply and energy harvest bank described herein can also be used to power the child weight sensing apparatus 400 and/or the pet safety monitoring apparatus 500. The child safety monitoring apparatus power supply 350 utilizes a voltage regulator 356 that receives DC voltage from a 9-volt Lithium Ion rechargeable battery 354, and converts the voltage to approximately 5V direct current output 358 to power the child safety monitoring apparatus 300. The child safety monitoring system energy harvest module 360 utilizes a radio frequency (RF) transceiver 382 for collecting radio frequency (RF) energy from a Wi-Fi radio frequency (RF) communication link 672 transmitted by the remote vehicle controller area network Wi-Fi transceiver 670. The energy harvest converter module 384 transforms the RF energy collected by the radio frequency (RF) transceiver 382 to electrical energy for storage in the energy harvest capacitor bank 386 and provides electrical energy to the power supply voltage regulator 356 to operate the child safety monitoring apparatus 300.

Figure 8A:
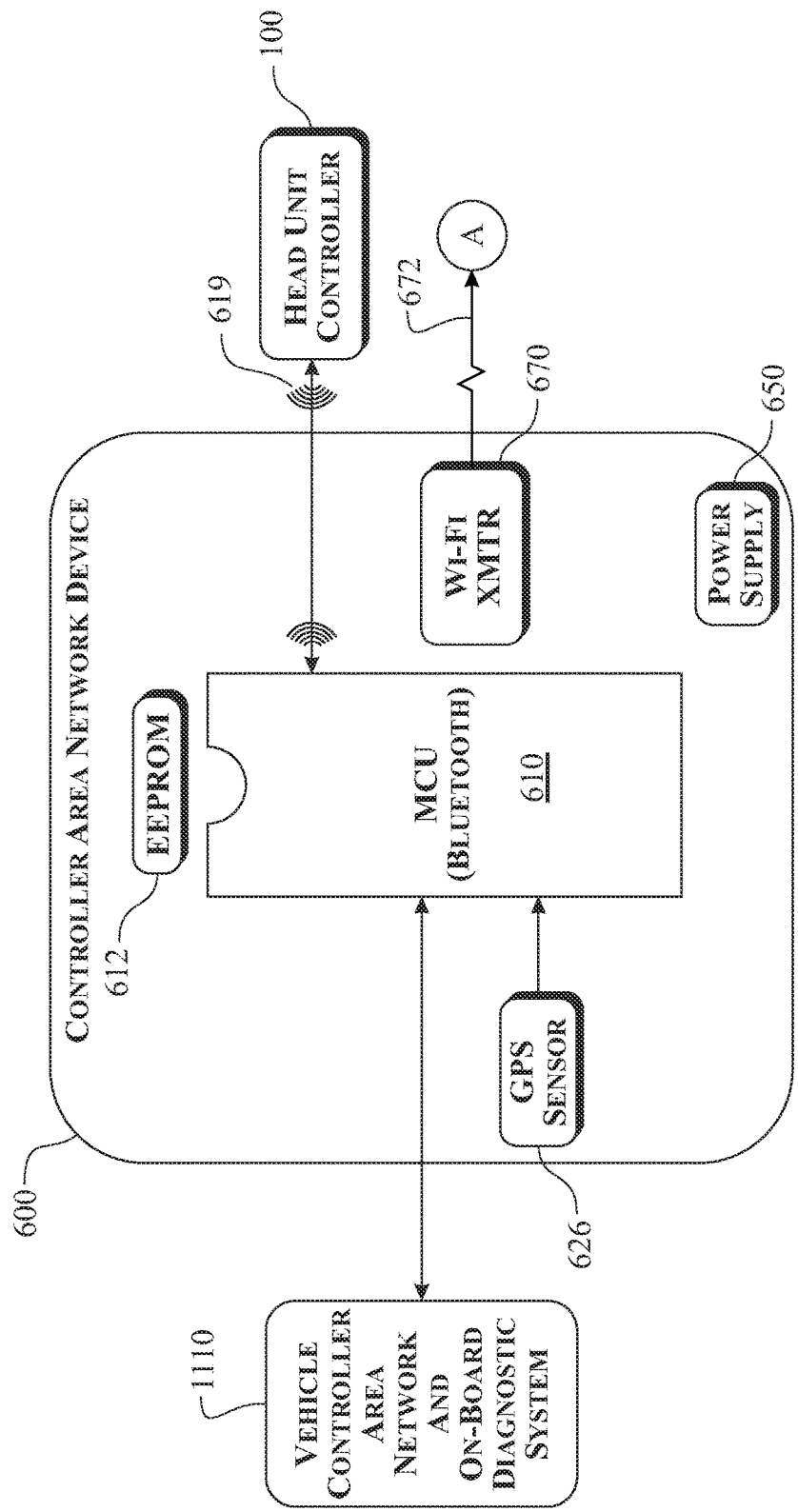
Figure 8B:
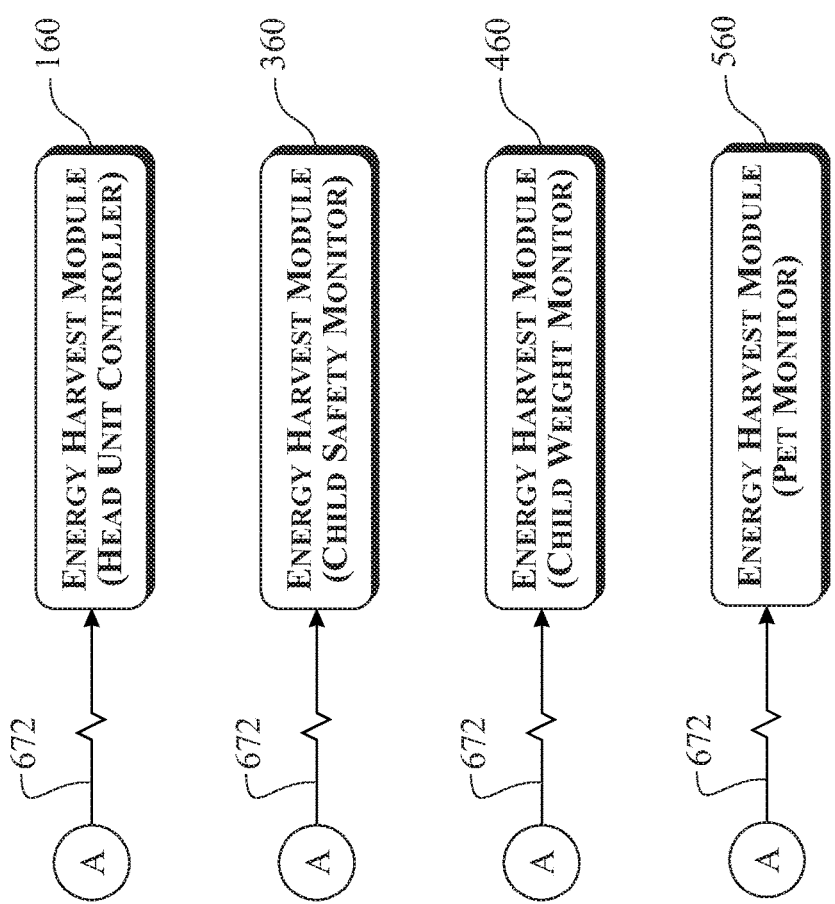

An exemplary vehicle controller area network apparatus 600 is illustrated in FIGS. 8A and 8B. The vehicle controller area network apparatus 600 includes a printed circuit board, any necessary electronic components to support the desired functions, at least one micro electro-mechanical sensor, and a Bluetooth communication circuit providing a communication link 619 with the head unit controller assembly 100. FIGS. 8A and 8B additionally illustrates the utilization of a remote vehicle controller area network Wi-Fi transceiver 670 to deliver power through a Wi-Fi radio frequency (RF) communication link 672 to the energy harvest modules 160, 360, 460, and 560 depicted in FIG. 8B for battery-less operation of the child and pet safety monitoring apparatus, child weight sensor apparatus, and the head unit controller.

The vehicle controller area network apparatus 600 includes at least one microprocessor 610 and one electrically erasable programmable read-only memory (EEPROM) 612 for monitoring and storing vehicle sensory data received from the vehicle controller area network and on-board diagnostic system 1110. The vehicle controller area network apparatus 600 also contains a global position system (GPS) locating circuit 626. The vehicle controller area network apparatus 600 communicates with the head unit controller assembly 100 through the Bluetooth wireless communication link 619 to provide controller area network and on-board diagnostic system data for detecting a condition when the parent or caregiver exits the vehicle 1100; then activates any associated alarms and warnings. The vehicle controller area network apparatus 600 can receive action commands from the head unit controller assembly 100 to activate the factory installed vehicle security alarm 1134, hazard lights 1130, vehicle interior lights 1132, and actuators for opening of door locks 1140 and rolling down of power windows 1142 to gain the attention of others near the vehicle 1100 and assist in accessing the vehicle interior 1102 to remove the child or the pet from exposure to any potential environmentally dangerous conditions within the vehicle interior 1102.

The remote vehicle controller area network power supply 650 utilizes 12 VDC vehicle battery power via the on-board diagnostic connector 1116 (FIG. 10) to which the vehicle controller area network apparatus 600 is connected.

Figures 9, 10:
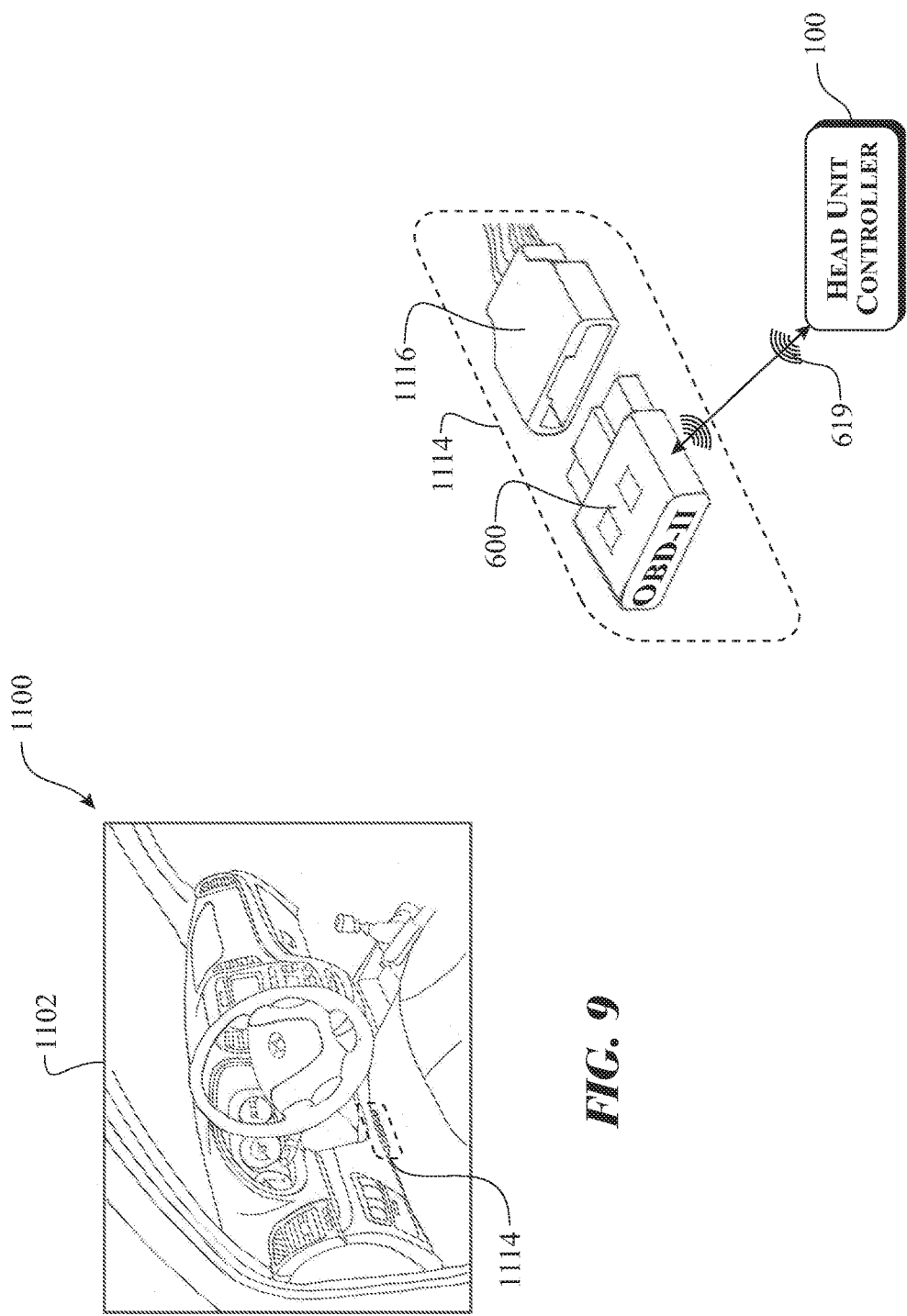
FIG. 9 presents a perspective view of an interior of a vehicle introducing a location of a vehicle on-board diagnostic connection point.
FIG. 10 presents a magnified isometric exploded assembly view of an exemplary remote vehicle controller area network apparatus being connected to the on-board diagnostic connector, wherein the remote vehicle controller area network apparatus is in wireless communication with the head unit controller.

An exemplary vehicle interior 1102, viewed from the driver's side door, is illustrated in FIG. 9, with a magnified view of a standard automotive J1962 connector 1114 being detailed in FIG. 10. The illustration introduces a location of an on-board diagnostic connector 1116, which is generally located under a steering column of the vehicle 1100. The on-board diagnostic connector 1116 includes connectivity between an exemplary remote vehicle controller area network apparatus 600 and an on-board diagnostic connector 1116, as illustrated in the exploded assembly view shown in FIG. 10. The remote vehicle controller area network apparatus 600 connects to a standard automotive J1962 connector 1114. The remote vehicle controller area network apparatus 600 communicates with the head unit controller assembly 100 through a Bluetooth wireless communication link 619 to access data stored within the vehicle controller area network apparatus 600. Data stored on the controller area network and on-board diagnostic system 1110 include but are not limited to door lock indication, door position indication (open or closed), ignition switch position, engine speed (commonly obtained in revolutions per minute), transmission gear position, a driver's side seat belt status (engaged or disengaged), a passenger's side seat belt status (engaged or disengaged), a driver's side seat pressure sensor indication, and a passenger's side seat pressure sensor indication. The vehicle controller area network apparatus 600 is capable of receiving action signals from the head unit controller assembly 100 to perform functions such as remotely unlocking the vehicle doors and rolling down the automatic windows, in order to transfer outside air into the vehicle interior 1102 to lower the extreme temperatures therein or mitigate the likelihood of at least one of a child and a pet from being trapped or locked in an unattended vehicle 1100. Additionally, the vehicle controller area network apparatus 600 can engage the vehicle hazard lights 1130 and activate the factory installed vehicle security alarm 1134 in order to gain the attention of bystanders in the vicinity of the vehicle 1100 to investigate and take action to remove at least one of the child or the pet from the vehicle 1100.

An exemplary flow diagram illustrating interfaces between the head unit controller input and output functions in accordance with the present invention is illustrated in FIG. 11. The head unit controller assembly 100 receives input from the proximal environment temperature sensor 320, the environment audio sensor 322, and the gyro-accelerometer motion sensor 323 contained within a child safety monitoring apparatus 300. The remote pet safety monitoring apparatus 500 which contains the temperature sensor 520, the motion sensor 523, and the global positioning system (GPS) locating circuit 526 also provides input to the head unit controller assembly 100. A child weight sensing apparatus 400 contains a force sensor 428 and provides additional input to the head unit controller assembly 100. The head unit controller assembly 100 also contains an independent temperature sensor 120, an audio sensor 122, a pyro-electric infrared (IR) motion detection micro sensor 124, and a global position system (GPS) location determining circuit 126, each of which acquire and provide input data.

A vehicle controller area network apparatus 600 is capable of providing both input and output coordination with the head unit controller assembly 100. The vehicle controller area network apparatus 600 provides input to the head unit controller assembly 100 through factory installed vehicle sensors including driver's and passenger's seat belt sensors 1120, driver's and passenger's seat pressure sensors 1122, door position sensors 1124, and an ignition position sensor 1126. The vehicle controller area network apparatus 600, receives output signals from the head unit controller assembly 100 to activate vehicle hazard lights 1130, interior lights 1132, vehicle security alarm 1134, door lock actuators 1140, and power window actuators 1142.

The head unit controller assembly 100 provides output signals to a portable computing device application 1210 to activate a portable computing device audible warning output 1212, communicate through a portable computing device graphical user interface (GUI) 1214, and transmit and optionally receive Short Message Service (SMS) text messages 1216. Additionally, the head unit controller assembly 100 provides output signals to a key FOB 1150 to activate a key FOB audible output 1152 (such as an audio piezo buzzer alarm), a key FOB visual output 1154 (such as a flashing LED warning light), and the like.

The head unit controller assembly 100 provides output signals to vehicle telematics services 1112 to engage emergency services 1230 and inform emergency contacts 1232 of the detected child or pet left unattended in the vehicle 1100.

The head unit controller assembly 100 also includes at least one independent audible output device 812 (such as a speaker, a whistle, a bell, and the like), a visual alarm 810 (such as a flashing Light Emitting Diode or LED, a colored LED, a flashing or colored incandescent bulb, and the like), and any other suitable notification component to inform the driver upon exiting the vehicle that at least one of a child or pet has been detected to be within the vehicle 1100.

Figure 13:
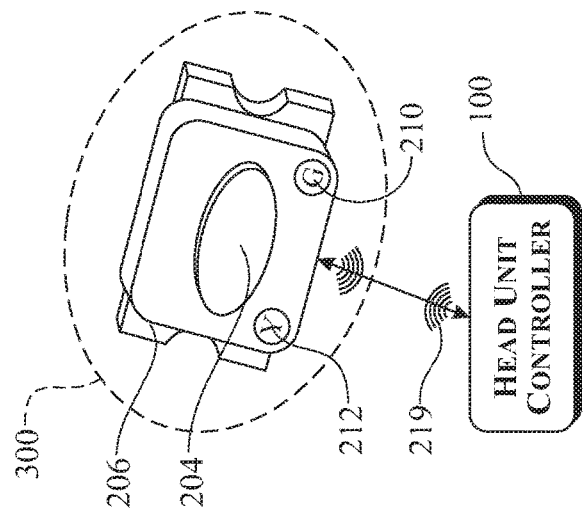
FIG. 13 presents a magnified perspective view of the exemplary child safety monitoring apparatus originally shown installed in FIG. 12.
Figure 12:
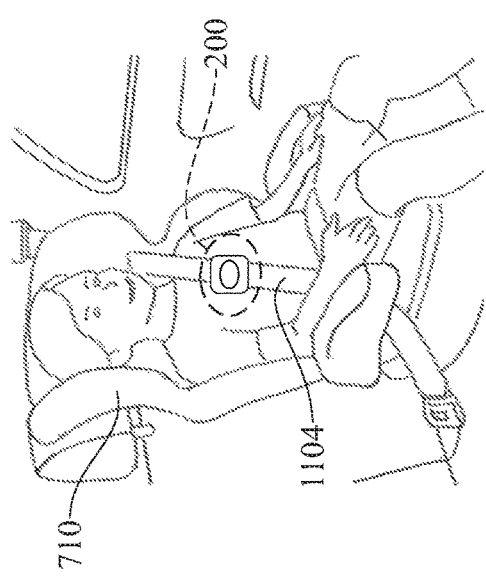
FIG. 12 presents a perspective view of an exemplary child safety monitoring apparatus installed upon a seat belt for monitoring a presence of a child seated within a booster seat.

The exemplary child safety monitoring apparatus 300 is shown in use in the illustration presented in FIGS. 12 and 13. The child safety monitoring apparatus 300 is secured to a vehicle seat belt 1104 utilized in conjunction with one of the child booster seat 710 and the infant/child car seat 720. The child safety monitoring apparatus 300 is designed to attach to any vehicle seat belt 1104, an infant seat harness belt, and the like using a child safety monitoring apparatus enclosure attachment clip 206. The child safety monitoring apparatus 300 includes a child safety monitoring apparatus enclosure 204 for enclosing the child safety apparatus circuit board and micro-electromechanical sensors. The child safety monitoring apparatus 300 can include a yellow light emitting element 212 to provide low battery warning and indication, and a green light emitting element 210 to provide to the indication that the apparatus is synchronized with the head unit controller assembly 100 through the Bluetooth wireless communication link 219.

Figure 15:
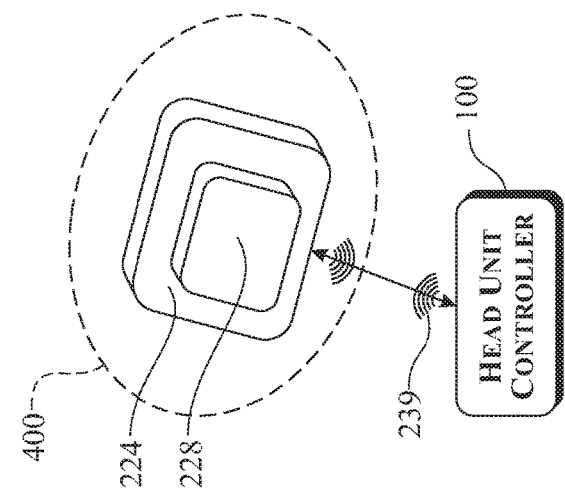
FIG. 15 presents a magnified perspective view of the child weight sensing apparatus originally shown installed in FIG. 14.
Figure 14:
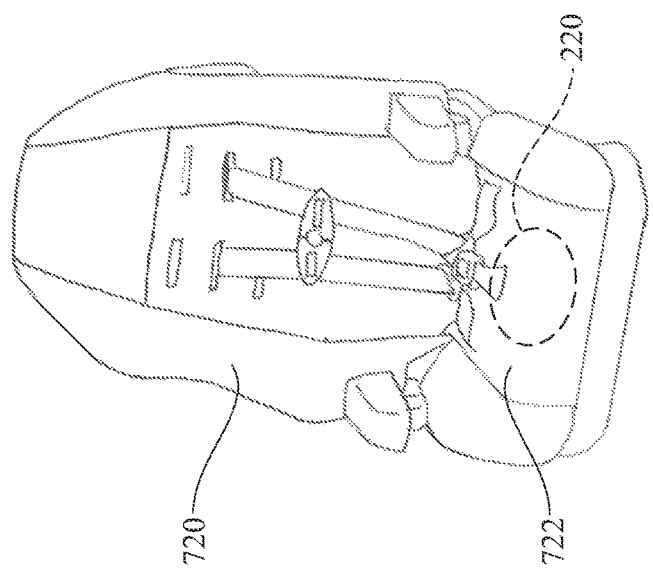
FIG. 14 presents a perspective view of an exemplary child weight sensing apparatus installed within a seat portion of a child safety seat.

An exemplary child weight sensing apparatus 400 is shown in use in the illustration presented in FIGS. 14 and 15. The child weight sensing apparatus 400 is attached to a bottom portion of the seat pad 722 of an exemplary one of a child car seat and an infant car seat 720. The child weight sensing apparatus 400 is located in a position to sense a weight (downward force) of the child sitting in one of the infant/child car seat 720 or the child booster seat 710. The child weight sensing apparatus 400 includes a child weight sensing apparatus enclosure 224 for enclosing the child weight sensing circuit board, the micro-electromechanical weight sensor 428, the power supply 450, and the other components thereof. The child weight sensing apparatus 400 contains a pressure sensor input element 228 that depresses on the micro-electromechanical weight sensor 428 so as to cause pressure to be applied to the micro-electromechanical weight sensor 428 equal to the weight of the child. The child weight sensing apparatus 220 communicates with the head controller unit assembly 100 using a Bluetooth wireless communication link 239.

Figure 17:
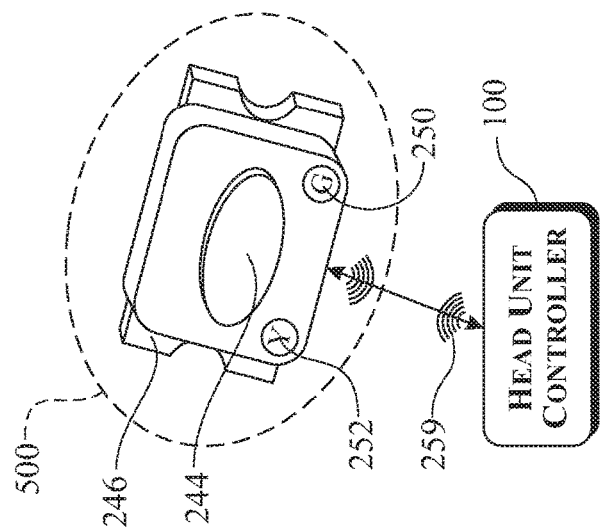
FIG. 17 presents a magnified perspective view of the pet safety monitoring apparatus originally shown installed in FIG. 16.
Figure 16:
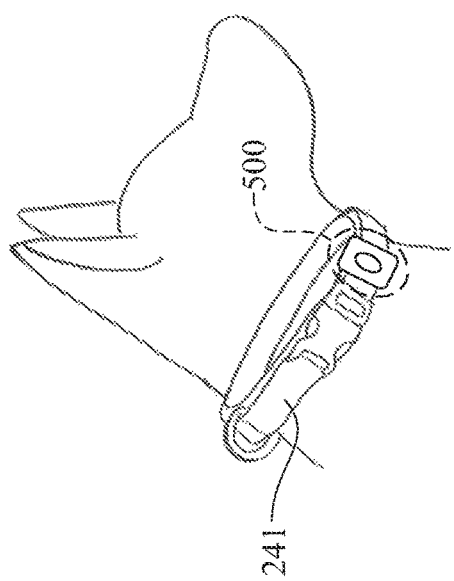
FIG. 16 presents a perspective view of an exemplary pet safety monitoring apparatus secured to a pet collar placed about a pet's neck.

An exemplary pet safety monitoring apparatus 500 is depicted attached to an exemplary pet collar 241, as illustrated in FIGS. 16 and 17. The pet safety monitoring apparatus 500 is typically worn by the pet attached to a pet collar 241 by a pet safety monitoring apparatus enclosure attachment clip 246. The pet safety monitoring apparatus 500 includes a pet safety monitoring apparatus enclosure 244 for enclosing the circuit board, micro-electromechanical sensors 520, 523, 526, and any other electronic components to support an operation of the apparatus. The pet safety monitoring apparatus 500 utilizes a yellow light emitting element 252 to provide low battery warning and indication, and green light emitting element 250 to provide to the indication of the apparatus synchronized with the head unit controller assembly 100 through a Bluetooth wireless communication link 259.

An exemplary head unit controller mirror apparatus 800 is illustrated in FIGS. 18 and 19. The head unit controller mirror apparatus 800 is manufactured to fit over the rearview mirror 802 of a vehicle 1100. A front-side view is depicted in FIG. 18 and a backside view is depicted in FIG. 19. The mirror encasing includes an additional convex mirror 804 to provide the driver with visibility of the child and/or the pet occupying the back seat so as to mitigate the chance of accidentally leaving the child or the pet behind. The head unit controller mirror apparatus 800 houses the head unit controller circuitry and sensors. The bottom portion of the mirror apparatus includes a visual alarm 810 that flashes and an audible output device 812 that chimes respectively upon indication of the driver exiting the vehicle 1100 while the child or the pet is detected as remaining within the vehicle 1100. Indications of the driver exiting the vehicle 1100 are derived from sensor indications provided through the vehicle controller area network apparatus 600. An audible input device 820 enables independent monitoring of audio signals (child voices, cries, screams, or pet barks, whines, etc.), while the pyro-electric infrared (IR) motion detector 822 enables monitoring for motion detection of an object. A Bluetooth wireless indicator 814 provides a visual indication of communication synchronization between the head unit controller mirror apparatus 800 and the child safety monitoring apparatus 300, 400 and/or the pet safety monitoring apparatus 500. A digital temperature display 816 provides real-time interior temperature information acquired by a temperature sensor housed in the mirror apparatus 800. A green light emitting element 818 provides indication that the head unit controller assembly 100 is in communication with the vehicle controller area network apparatus 600. A blue light emitting element 819 can be located near the convex mirror 804 in the upper right portion of the head unit controller mirror apparatus 800 to provide an indication of a force weight detected by the child weight sensor apparatus 400.

The backside of the head unit controller mirror apparatus 800 contains a power connector 842 to connect to the vehicle 12 VDC power 152. A signal and charging connector 844 enables charging of the head unit controller mirror apparatus through the 12 VDC vehicle power 152. A beacon circuit 840 housed within the mirror apparatus is utilized to determine a distance between the head unit controller mirror apparatus 800 and at least one of a Smartphone operating the mobile phone application 1210, the key FOB 1150, and any other portable paired device. Energy harvesting photovoltaic power converters 829 collect photo energy to operate the controller device and recharge a battery (not shown), thus prolonging battery life. A global position system (GPS) locating circuit 826 provides an ability to acquire a location of the vehicle 1100, thus enabling the apparatus to convey a location to the parent, the caregiver, any emergency contacts, and any emergency responders via telematics subscriber services 1112.

Figure 21:
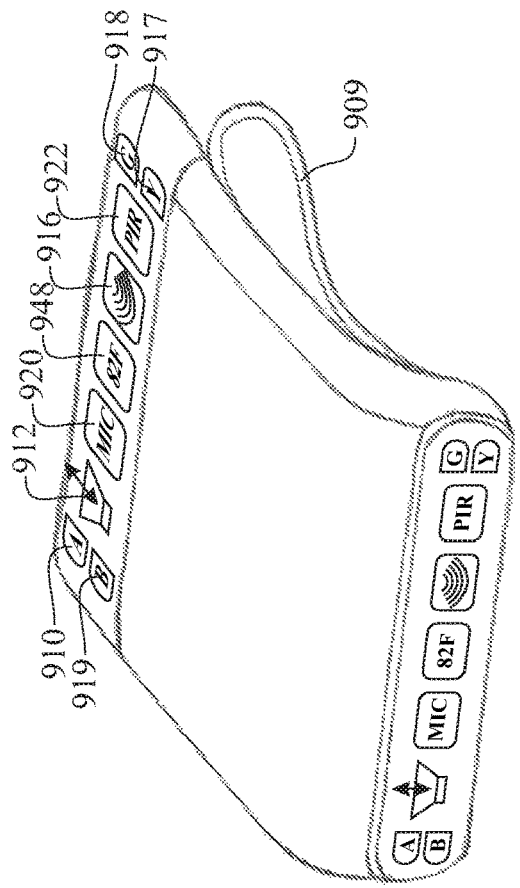
FIG. 21 presents an isometric front view of the head unit controller apparatus originally introduced in FIG. 20.
Figure 20:
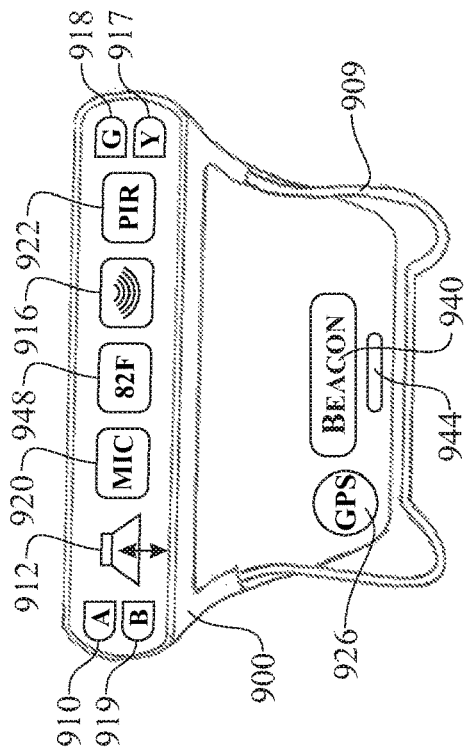
FIG. 20 presents a front view of an exemplary head unit controller apparatus adapted for attachment to a sun visor of a vehicle.

An exemplary head unit controller sun visor apparatus 900 is illustrated in FIGS. 20 and 21. The head unit controller sun visor apparatus 900 can be attached to the driver or passenger-side sun visor utilizing the visor clip 909. A front-side view of the head unit controller sun visor apparatus 900 is illustrated in FIG. 20 and a topside view is illustrated in FIG. 21. The sun visor apparatus includes dual (front side and topside) warning and alarm, and sensor locations to provide full functionality while the apparatus is attached to the vehicle installed sun visor (not shown) in the normal stowed position, or lowered down toward the front window in the visor position. The dual position operation ensures the apparatus can independently monitor the vehicle interior environment in both positions, thus mitigating the chance of accidentally leaving the child or the pet behind. The head unit controller sun visor apparatus 900 houses the head unit controller circuitry, the associated micro sensors and any other electronic components to obtain the desired functionality for the apparatus. The head unit controller sun visor apparatus 900 includes dual visual alerts 910 that flashes and at least one audible output component 912 that chimes upon an indication of the driver exiting the vehicle 1100 while the child or the pet is detected as being within the vehicle 1100. Indications of the driver exiting the vehicle 1100 are derived from sensor indications provided using the vehicle controller area network apparatus 600. Paired microphones 920 and paired pyro-electric infrared (IR) motion detectors 922 enable independent monitoring of audio signals (child voices, cries, screams, or pet barks, whines, etc.), or object motion detection in either visor position. A Bluetooth wireless indicator 916 presents a visual indication of communication synchronization between the head unit controller sun visor apparatus 900 and the child safety monitoring apparatus 300, 400 or the pet safety monitoring apparatus 500. Paired digital temperature displays 948 present real-time interior temperature sensed by the local temperature sensors housed in the sun visor apparatus. Paired green light emitting elements 918 provides indication that the head controller sun visor apparatus is in communication with the remote vehicle controller area network apparatus 600. Paired yellow light emitting elements 917 presents a low battery warning indication. Paired blue light emitting elements 919 presents an indication of a weight detected by the child weight sensor apparatus 400.

The underside of the head unit controller sun visor apparatus 900 contains a signal and charging connector 944, wherein the signal and charging connector 944 is provided to enable charging of the head unit controller sun visor apparatus from the 12 VDC vehicle power 152. A beacon circuit 940 housed within the head unit controller sun visor apparatus 900 is utilized to determine proximity between the head unit controller sun visor apparatus 900 and at least one of the Smartphone utilizing the portable computing device application 1210 and key FOB 1150. A global position system (GPS) locating circuit 926 provides location services to a parent or a caregiver, emergency contacts 1232, and emergency responders 1230 through telematics subscriber services 1112.

An exemplary head unit controller vehicle overhead apparatus 1000 is illustrated in FIGS. 22 and 23. The head unit controller vehicle overhead apparatus 1000 can be attached to a vehicle overhead light (not shown) utilizing a multi-expandable trim fastener clip 1006. The overhead multi-expandable trim fastener clip 1006 includes a horizontal slide component 1004 to allow for width expansion, and perpendicular slides 1002, the perpendicular slides 1002 including both a right hand side and a left hand side, allows for length expansion as necessary to provide a best-fit for various possibilities. A front-side overhead view of the head unit controller vehicle overhead apparatus 1000 is depicted in FIG. 22 and a topside view is depicted in FIG. 23. Two topside clips 1008 allow for the head unit controller vehicle overhead apparatus 1000 to be adapted to hang behind the driver's side head rest (not shown).

The head unit controller vehicle overhead apparatus 1000 includes warning, alarm, and sensors located to provide full functionality while the apparatus is attached in the vehicle overhead, or hung behind the driver head rest. The head unit controller vehicle overhead apparatus 1000 houses the head unit controller circuitry, the associated micro sensors, and any other electronic components necessary to provide the desired functionality of the apparatus. The head unit controller vehicle overhead apparatus 1000 includes a visual alarm 1010 that flashes and audible output component 1012 that chimes upon indication of the driver exiting the vehicle 1100 while the child or the pet is detected to remain in the vehicle 1100. Indications of the driver exiting the vehicle 1100 are derived from sensor indications provided through the remote vehicle controller area network apparatus 600. An audible input device 1020 enables monitoring of audio signals (child voices, cries, screams, or pet barks, whines, etc.) and a pyro-electric infrared (IR) motion detector 1022 enables monitoring to detect motion of an object. A Bluetooth wireless indicator 1014 provides a visual indication of communication synchronization between the head unit controller vehicle overhead apparatus 1000 and the child safety monitoring apparatus 300, 400 or the pet safety monitoring apparatus 500. A digital temperature display 1048 provides a real-time interior temperature acquired by a temperature sensor housed in the head unit controller vehicle overhead apparatus 1000. A green light emitting element 1018 provides indication that the head unit controller vehicle overhead apparatus 1000 is in communication with the vehicle controller area network apparatus 600. A yellow light-emitting element 1017 provides a low battery warning indication. A blue light-emitting element 1019 provides an indication of a weight detected by the child weight sensor apparatus 400.

The underside of the head unit controller vehicle overhead apparatus 1000 includes a signal and charging connector 1044, enabling recharging an overhead apparatus battery (not shown). A beacon circuit 1040 housed within the overhead apparatus is utilized to determine proximity between the head unit controller vehicle overhead apparatus 1000 and at least one of the Smartphone operating the portable computing device application 1210 or the key FOB 1150. A global position system (GPS) locating circuit 1026 provides location services to at least one of a parent or a caregiver, emergency contacts 1232, and emergency responders 1230 through telematics subscriber services 1112.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REFERENCE ELEMENTS

Ref. No. Description
100 head unit controller assembly
110 microprocessor
112 electrically erasable programmable read-only memory (EEPROM)
119 Bluetooth wireless communication link
120 proximal ambient air temperature sensor
122 audio sensor
124 pyro-electric infrared (IR) motion detection micro sensor
126 global position system (GPS) locating circuit
140 head unit beacon
150 head unit controller power supply
152 12 volt vehicle battery
154 9 volt Lithium Ion rechargeable battery
156 voltage regulator
158 5 volt direct current output
159 low battery indicator
160 head unit controller energy harvest module
170 first external power source
172 photovoltaic power cell
176 capacitor bank
180 energy harvest module
182 radio frequency (RF) transceiver
184 energy harvest converter module
186 energy harvest capacitor bank
200 child safety monitoring apparatus
204 child safety monitoring apparatus enclosure
206 child safety monitoring apparatus enclosure attachment clip
210 green light emitting element
212 yellow light emitting element
219 Bluetooth wireless communication link
220 child weight sensing apparatus
224 child weight sensing apparatus enclosure
228 pressure sensor input element
239 Bluetooth wireless communication link
240 pet safety monitoring apparatus
241 pet collar
244 pet safety monitoring apparatus enclosure
246 pet safety monitoring apparatus enclosure attachment clip
250 green light emitting element
252 yellow light emitting element
259 Bluetooth wireless communication link
300 child safety monitoring apparatus 310 microprocessor
312 electrically erasable programmable read-only memory (EEPROM)
319 Bluetooth wireless communication link
320 proximal environment temperature sensor
322 environment audio sensor
323 gyro-accelerometer motion sensor
327 Carbon Dioxide ($CO_2$) sensor
350 child safety monitoring apparatus power supply
354 9 volt Lithium Ion rechargeable battery
356 voltage regulator
358 12 V DC output
359 low battery indicator
360 child safety monitoring system energy harvest module
382 radio frequency (RF) transceiver
384 energy harvest converter module
386 energy harvest capacitor bank
400 child weight sensing apparatus
410 microprocessor
412 electrically erasable programmable read-only memory (EEPROM)
419 Bluetooth wireless communication link
428 force sensor
450 child weight sensor power supply
459 low battery indicator
460 child weight sensing apparatus energy harvest module
500 pet safety monitoring apparatus
510 microprocessor
512 electrically erasable programmable read-only memory (EEPROM)
519 Bluetooth wireless communication link
520 proximal environment temperature sensor
523 gyro-accelerometer motion sensor
526 global position system (GPS) locating circuit
527 Carbon Dioxide ($CO_2$) sensor
550 pet unit power supply
559 low battery indicator
560 pet safety monitoring system energy harvest module
600 vehicle controller area network apparatus
610 microprocessor
612 electrically erasable programmable read-only memory (EEPROM)
619 Bluetooth wireless communication link
626 global position system (GPS) locating circuit
650 remote vehicle controller area network power supply
670 remote vehicle controller area network Wi-Fi transceiver
672 Wi-Fi radio frequency (RF) communication link
710 child booster seat
720 one of a child car seat and an infant car seat
722 seat pad
800 head unit controller mirror apparatus
802 vehicle rear-view mirror
804 convex mirror
810 visual alarm
812 audible output device
814 Bluetooth wireless indicator
816 digital temperature display
818 green light emitting element
819 blue light emitting element
820 audible input device
822 pyro-electric infrared (IR) motion detector
826 global position system (GPS) locating circuit
829 photovoltaic power converters
840 beacon circuit
842 power connector
844 signal and charging connector
900 head unit controller sun visor apparatus
909 visor clip
910 dual visual alerts
912 audible output component
916 Bluetooth wireless indicator
917 paired yellow light emitting elements
918 paired green light emitting elements
919 paired blue light emitting elements
920 paired microphones
922 paired pyro-electric infrared (IR) motion detectors
926 global position system (GPS) locating circuit
940 beacon circuit
944 signal and charging connector
948 paired digital temperature displays
1000 head unit controller vehicle overhead apparatus
1002 right hand side and left hand side perpendicular slides
1004 horizontal slide component
1006 multi-expandable trim fastener clip
1008 topside clips
1010 visual alarm
1012 audible output component
1014 Bluetooth wireless indicator
1017 yellow light emitting element
1018 green light emitting element
1019 blue light emitting element
1020 audible input device
1022 pyro-electric infrared (IR) motion detector
1026 global position system (GPS) locating circuit
1040 beacon circuit
1044 signal and charging connector
1048 digital temperature display
1100 vehicle
1102 vehicle interior
1104 vehicle seat belt
1110 vehicle controller area network and on-board diagnostic system
1112 vehicle telematics services
1114 standard automotive J connector
1116 on-board diagnostic connector
1120 driver's and passenger's seat belt sensors
1122 driver's and passenger's seat pressure sensors
1124 door position sensors
1126 ignition position sensor
1130 vehicle hazard lights
1132 interior lights
1134 vehicle security alarm
1140 door lock actuators
1142 power window actuators
1150 key FOB
1152 key FOB audible output
1154 key FOB visual output
1200 cloud based services
1210 portable computing device application
1212 portable computing device audible warning output
1214 portable computing device graphical user interface (GUI)
1216 Short Message Service (SMS) text message
1230 emergency services
1232 emergency contacts
1234 emergency contacts and 9-1-1 emergency services

What is claimed is:
1. A system for mitigating the likelihood or preventing the occurrence of leaving a living entity, behind in an unattended vehicle, wherein the living entity is at least one of a child and a pet, wherein a vehicle interior is subjecting the one of the child and the pet to an environment having potentially life threatening conditions, the system comprising:
- a factory installed vehicle controller area network system in operational control with at least one factory installed function, wherein the factory installed functions include a vehicle alarm, a light, a door lock, and a power window actuator;
- a head unit controller located within the vehicle and in signal communication with the factory installed vehicle controller area network system,
- wherein the head unit controller operates in accordance with the following steps:
    - detecting a physical presence of a living entity within one of an interior of vehicle, an infant seat, or a child car seat;
    - detecting the presence of one of a driver or a caregiver exiting the vehicle by utilizing data acquired by a vehicle controller area network sensor;
    - activating at least one factory installed function, by utilizing the factory installed vehicle controller area network system to warn others outside of the vehicle and obtain aid to remove the living entity from the interior of the vehicle;
    - determining that a proximity threshold between the head unit controller and a remotely carried system monitoring apparatus is satisfied based upon a detected distance between the head unit controller and the associated remotely carried system monitoring apparatus;
    - in response to the detected physical presence of the at least one living entity left unattended within the vehicle alerting a target recipient by at least one of:
        - (a) generating a notification message and transmitting the notification message to the remotely carried system monitoring apparatus,
        - (b) sending a signal to the remotely carried system monitoring apparatus to activate an alarm on the remotely carried system monitoring apparatus; and
    - utilizing a vehicle telematic subscriber service to transmit a notification to at least one target recipient.

2. The system of claim 1, further comprising a temperature sensor in signal communication with the head unit controller, the head unit controller further operating in accordance with additional steps of:
- obtaining a temperature of a vehicle interior using the temperature sensor;
- determining that the temperature of the vehicle interior exceeds a predetermined temperature limit, wherein the predetermined temperature limit is a temperature that is considered to pose a potential threat to life;
- activating the power window actuator by utilizing a factory installed vehicle controller area network system to reduce the temperature within the vehicle interior.

3. The system of claim 1, further comprising a temperature sensor in signal communication with the head unit controller, the temperature sensor being located in an associated one of a child safety monitoring apparatus and a pet safety monitoring apparatus, the head unit controller further operating in accordance with an additional step of:
- determining a value indicative of an entity monitoring temperature of an environment proximate the living entity.

4. The system of claim 1, further comprising an audio sensor in signal communication with the head unit controller, the audio sensor being located in an associated one of a child safety monitoring apparatus and a pet safety monitoring apparatus, the head unit controller further operating in accordance with an additional step of:
- monitoring the audio sensor to detect to t least one of crying, screaming, speech, barking, and whining, thus indicating the presence of the living entity within the vehicle.

5. The system of claim 1, the head unit controller further comprising at least one alert element, the head unit controller further operating in accordance with additional steps of:
- activating the at least one alert element on the head unit controller to warn the one of the driver or the caregiver of the detected physical presence of the living entity within the vehicle.

6. The system of claim 1, further comprising a force pressure sensor, the head unit controller further operating in accordance with additional steps of:
- identifying a force applied to the force pressure sensor, wherein the force is created by a weight of the child; and
- determining that a child is present based upon the force obtained from the force pressure sensor.

7. The system of claim 1, further comprising a Global Positioning System (GPS), the head unit controller further operates by utilizing the GPS to determine a geographic location of the vehicle.

8. The system of claim 1, further comprising a Global Positioning System (GPS) located in an associated one of a child safety monitoring apparatus and a pet safety monitoring apparatus, the associated one of a child safety monitoring apparatus and a pet safety monitoring apparatus providing location information obtained through the GPS to the head unit controller, wherein the head unit controller further operates by utilizing the location information to determine the presence of the living entity within the vehicle.

9. The system of claim 1, further comprising a motion sensor is located in one of a child safety monitoring apparatus or a pet safety monitoring apparatus, the head unit controller further operates by utilizing the motion sensor to detect a motion of the living entity present within the vehicle, the detected motion being indicative of a presence of the living entity within the vehicle.

10. The system of claim 1, further comprising a Bluetooth transceiver and the remotely carried system monitoring apparatus comprising a Bluetooth transceiver, the head unit controller further operating in accordance with additional steps of:
- transmitting a Bluetooth signal from the Bluetooth transceiver within the vehicle to the Bluetooth transceiver of the remotely carried system monitoring apparatus to inform a person carrying the remotely carried system monitoring apparatus of a living entity remaining within the vehicle.

11. The system of claim 1, further comprising a Wi-Fi transceiver and the remotely carried system monitoring apparatus comprising a Wi-Fi transceiver, the head unit controller further operating in accordance with additional steps of:
- transmitting a Wi-Fi signal from the Wi-Fi transceiver within the vehicle to the Wi-Fi transceiver of the remotely carried system monitoring apparatus to inform a person carrying the remotely carried system monitoring apparatus of a living entity remaining within the vehicle.

12. A system for mitigating the likelihood or preventing the occurrence of leaving a living entity, behind in an unattended vehicle, wherein the living entity is at least one of a child and a pet, wherein a vehicle interior is subjecting the one of the child and the pet to an environment having potentially life threatening conditions, the system comprising:
- a factory installed vehicle controller area network system in operational control with at least one factory installed function, wherein the factory installed functions include a vehicle alarm, a light, a door lock, and a power window actuator;
- a head unit controller located within the vehicle and in signal communication with the factory installed vehicle controller area network system;
- a remotely carried system monitoring apparatus;
- a wireless transmitter, the wireless transmitter and the remotely carried system monitoring apparatus having compatible wireless communication protocols,
- wherein the head unit controller operates in accordance with the following steps:
  - detecting a physical presence of a living entity within one of an interior of vehicle, an infant seat, or a child car seat;
  - detecting the presence of one of a driver or a caregiver exiting the vehicle by utilizing data acquired by a vehicle controller area network sensor, the vehicle controller area network sensor including at least one of: a belt sensor, a seat pressure sensor, a door position sensor, and an ignition sensor;
  - activating at least one factory installed function, by utilizing the factory installed vehicle controller area network system to warn others outside of the vehicle and obtain aid to remove the living entity from the interior of the vehicle;
  - determining that a proximity threshold between the head unit controller and the remotely carried system monitoring apparatus is satisfied based upon a detected distance between the head unit controller and the associated remotely carried system monitoring apparatus;
  - in response to the detected physical presence of the at least one living entity left unattended within the vehicle alerting a target recipient by at least one of:
    - (a) generating a notification message and transmitting the notification message to the remotely carried system monitoring apparatus, and
    - (b) sending a signal to the remotely carried system monitoring apparatus to activate an alarm on the remotely carried system monitoring apparatus; and
  - utilizing a vehicle telematic subscriber service to transmit a notification to at least one target recipient.

13. The system of claim 12, further comprising a temperature sensor in signal communication with the head unit controller, the head unit controller further operating in accordance with additional steps of:
- obtaining a temperature of a vehicle interior using the temperature sensor;
- determining that the temperature of the vehicle interior exceeds a predetermined temperature limit, wherein the predetermined temperature limit is a temperature that is considered to pose a potential threat to life; and
- activating the power window actuator by utilizing a factory installed vehicle controller area network system to reduce the temperature within the vehicle interior.

14. The system of claim 12, the head unit controller further comprising at least one alert element, the head unit controller further operating in accordance with additional steps of:
- activating the at least one alert element on the head unit controller to warn the one of the driver or the caregiver of the detected physical presence of the living entity within the vehicle.

15. The system of claim 12, further comprising a force pressure sensor, the head unit controller further operating in accordance with additional steps of:
- identifying a force applied to the force pressure sensor, wherein the force is created by a weight of the child; and
- determining that a child is present based upon the force obtained from the force pressure sensor.

16. The system of claim 12, further comprising a Global Positioning System (GPS), the head unit controller further operates by utilizing the GPS to determine a geographic location of the vehicle.

17. The system of claim 12, further comprising a motion sensor is located in one of a child safety monitoring apparatus or a pet safety monitoring apparatus, the head unit controller further operates by utilizing the motion sensor to detect a motion of the living entity present within the vehicle, the detected motion being indicative of a presence of the living entity within the vehicle.

18. The system of claim 12, wherein the wireless communication protocol is at least one of Bluetooth and Wi-Fi, the head unit controller further operating in accordance with additional steps of:
- transmitting a wireless signal from the wireless transmitter within the vehicle to the like transceiver of the remotely carried system monitoring apparatus to inform a person carrying the remotely carried system monitoring apparatus of a living entity remaining within the vehicle.

19. The system of claim 12, the remotely carried system monitoring apparatus is at least one of:
- a portable computing device,
- a Smartphone,
- a key fob,
- a Wi-Fi enabled portable device,
- a Wi-Fi enabled key fob,
- a Wi-Fi enabled Smartphone,
- a Bluetooth enabled portable device,
- a Bluetooth enabled key fob, and
- a Bluetooth enabled Smartphone.

20. The system of claim 12, further comprising a vehicle on-board diagnostic adaptor provided in signal communication with the factory installed vehicle controller area network system,
wherein the head unit controller is connected to the vehicle on-board diagnostic adaptor.

* * * * *